US007617520B2

(12) United States Patent
Naizhen et al.

(10) Patent No.: US 7,617,520 B2
(45) Date of Patent: Nov. 10, 2009

(54) SETTING APPARATUS, SETTING METHOD, PROGRAM, AND RECORDING MEDIUM

(75) Inventors: Qi Naizhen, Zama (JP); Kudo Michiharu, Kamokuru (JP)

(73) Assignee: International Business Machines Corporation, Armonk, NY (US)

(*) Notice: Subject to any disclaimer, the term of this patent is extended or adjusted under 35 U.S.C. 154(b) by 835 days.

(21) Appl. No.: 11/062,282

(22) Filed: Feb. 18, 2005

(65) Prior Publication Data

US 2005/0160263 A1 Jul. 21, 2005

(30) Foreign Application Priority Data

Feb. 20, 2004 (JP) ............................... 2004-045217

(51) Int. Cl.
*G06F 17/00* (2006.01)
(52) U.S. Cl. ....................................................... 726/1
(58) Field of Classification Search ................. 726/1–4,
726/18, 21, 27, 28–32, 17; 707/1, 9, 10;
709/225; 713/155–159, 167, 189–194, 166
See application file for complete search history.

(56) References Cited

U.S. PATENT DOCUMENTS 7,167,918 B2 * 1/2007 Byrne et al. ................. 709/229

OTHER PUBLICATIONS

E. Damiani, S. De Capitani di Vimercati, S. Paraboschi, P. Samarati, "A Fine-Grained Access Control System for XML Documents," in ACML Transactions on Information and System Security (May 2002).*

Alban Gabilon, Manuel Munier, Jean-Jacques Bascou, Laurent Gallon, and Emmanuel Bruno, "An Access Control Model for Tree Data Structures," in Springer-Verlag. ISC 2002, LNCS 2433, pp. 117-135, 2002.*

E. Damiani, S. De Capitani di Vimercati, S. Paraboschi, P. Samarati, "Design and Implementation of an Access Control Processor for XML Documents," in Proceedings of the International Conference on Very Large Database (2000).*

E. Damiani, S De Capitani di Vimercati, S. Paraboschi, P. Samarati, "A Fine-Grained Access Control System for XML Documents", in ACML Transactions on Information and System Security (May 2002).*

Alban Gabilon, Manuel Munier, Jean-Jacques Bascou, Laurent Gallon, and Emmanuel Bruno, "An Access Control Model for Tree Data Structures," in Springer-Verlag. ISC 2002, LNCS 2433, pp. 117-135, 2002.*

(Continued)

*Primary Examiner*—Ellen Tran
*Assistant Examiner*—Hee Song
(74) *Attorney, Agent, or Firm*—Shimokaji & Associates, P.C.

(57) ABSTRACT

A setting apparatus sets any of authorization for and prohibition of access to data with a hierarchical structure. The setting apparatus includes: an object selection unit for selecting at least one object from a plurality of objects constituting the hierarchical structure; a pattern selection unit for selecting at least one pattern from a plurality of patterns, each of which determines a relative position in the hierarchical structure to the object selected by the object selection unit; and an access control policy setting unit for setting any of authorization for and prohibition of access to the object selected by the object selection unit and each of objects at the relative position to the selected object, which relative position is determined by the pattern selected by the pattern selection unit.

2 Claims, 29 Drawing Sheets

OTHER PUBLICATIONS

Godik, S. et al., "eXtensible Access Control Markup Language (XACML) Version 1.1," http://www.oasis-open.org/committes/xacml/repository/cs-xacml-specification-1.1.pdf. Aug. 7, 2003.*

Markus Lorch, Seth Proctor, and Rebekah Lepro, "First Experiences Using XACML for Access Control in Distributed Systems," ACM Workshop on XML Security, Oct. 31, 2003.*

Elise Bertino et al., "On Specifying Security Policies for Web Documents with an XML-based Language," pp. 57-65, SACMOT'01, May 3-4, 2001.*

Chutiporn Anutariya et al., "A Rule-Based XML Access Control Model," LNCS 2876, pp. 35-48, 2003.*

* cited by examiner (a)

```
<Organization>
   <department code="A00">
      <Employee role="Researcher">
         <Name>Alice</Name>
         <Salary>1000</Salary>
      </Employee>
   </department>
</Organization>
```

| OBJECT STATE | OBJECT TYPE | FIRST PATTERN | SECOND PATTERN | THIRD PATTERN | FOURTH PATTERN | ... |
|---|---|---|---|---|---|---|
| INITIAL | ELEMENT OBJECT | ○ | ○ | × | ○ | ... |
| | ATTRIBUTE OBJECT | ○ | × | × | × | ... |
| | ... | ... | ... | ... | ... | ... |
| AUTHORIZED | ELEMENT OBJECT | ○ | ○ | ○ | ○ | ... |
| | ATTRIBUTE OBJECT | ○ | × | ○ | × | ... |
| | ... | ... | ... | ... | ... | ... |
| PROHIBITED | ELEMENT OBJECT | × | × | × | × | ... |
| | ATTRIBUTE OBJECT | × | × | × | × | ... |
| | ... | ... | ... | ... | ... | ... |

300

FIG.6
(a)    310
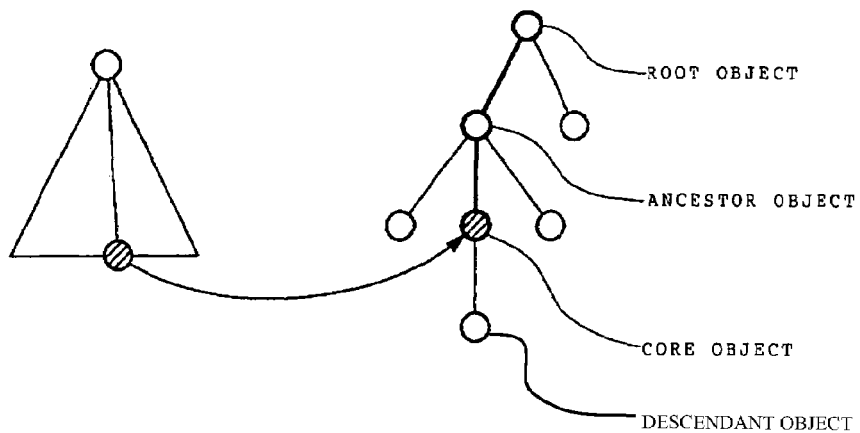
- ROOT OBJECT
- ANCESTOR OBJECT
- CORE OBJECT
- DESCENDANT OBJECT
(b)    310
STATE TRANSITION DIAGRAM OF CORE OBJECT
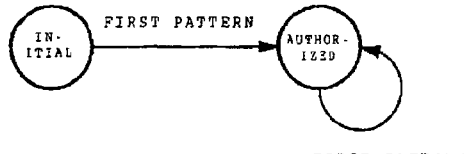
STATE TRANSITION DIAGRAM OF ANCESTOR OBJECT
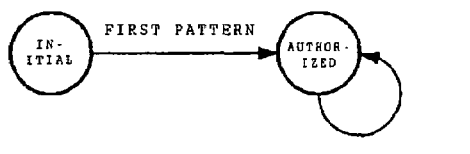
STATE TRANSITION DIAGRAM OF DESCENDANT OBJECT
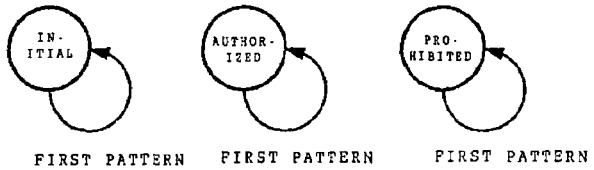

FIG. 7
(a)  310
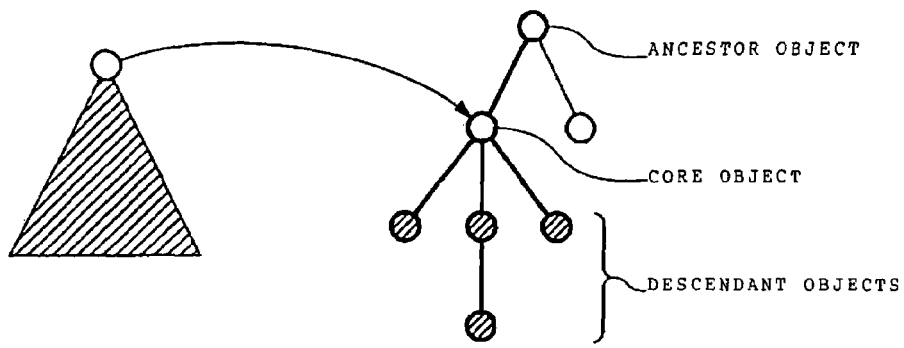
(b)
STATE TRANSITION DIAGRAM OF
CORE OBJECT
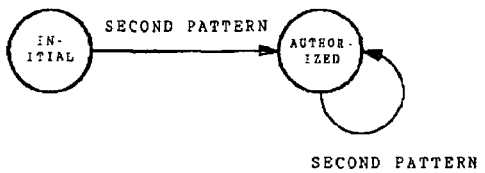
STATE TRANSITION DIAGRAM OF
ANCESTOR OBJECT
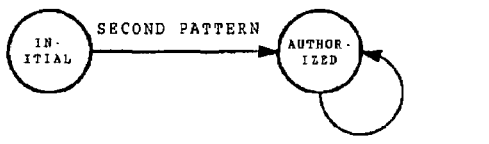
STATE TRANSITION DIAGRAM OF
DESCENDANT OBJECT
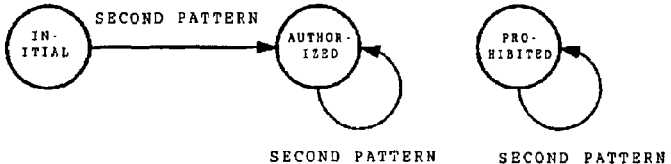

FIG. 8
(a)
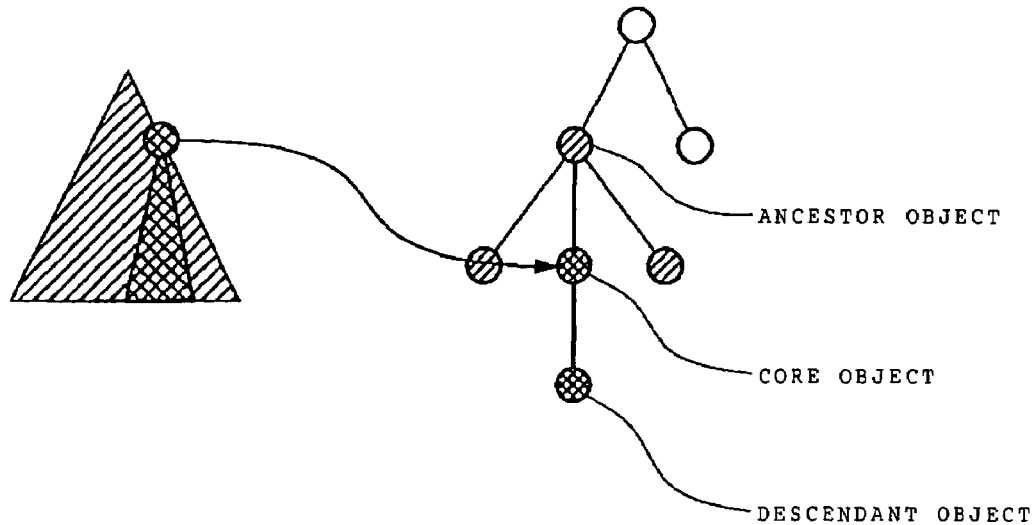
ANCESTOR OBJECT
CORE OBJECT
DESCENDANT OBJECT
(b)
STATE TRANSITION DIAGRAM OF
CORE OBJECT
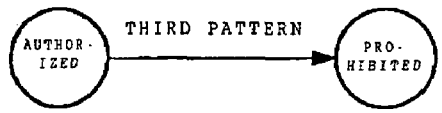
STATE TRANSITION DIAGRAM OF
ANCESTOR OBJECT
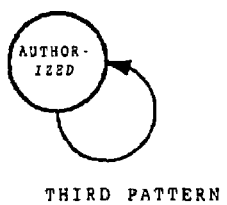
THIRD PATTERN
STATE TRANSITION DIAGRAM OF
DESCENDANT OBJECT
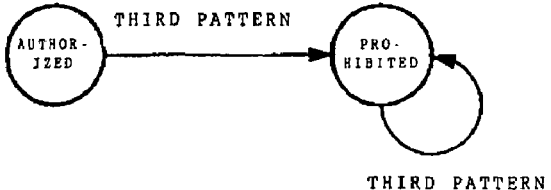

FIG. 9
(a) 310
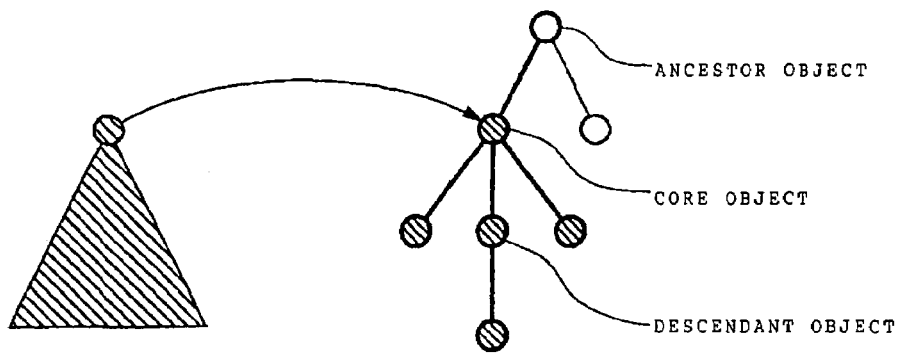
- ANCESTOR OBJECT
- CORE OBJECT
- DESCENDANT OBJECT
(b) 310
STATE TRANSITION DIAGRAM OF CORE OBJECT
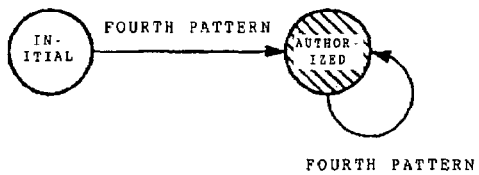
STATE TRANSITION DIAGRAM OF ANCESTOR OBJECT
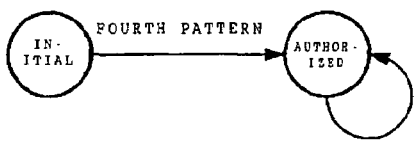
STATE TRANSITION DIAGRAM OF DESCENDANT OBJECT
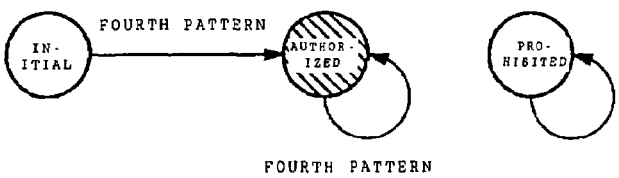

FIG.15
(a)
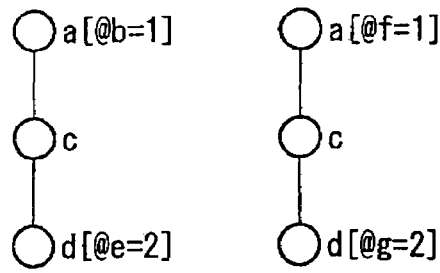
(b)
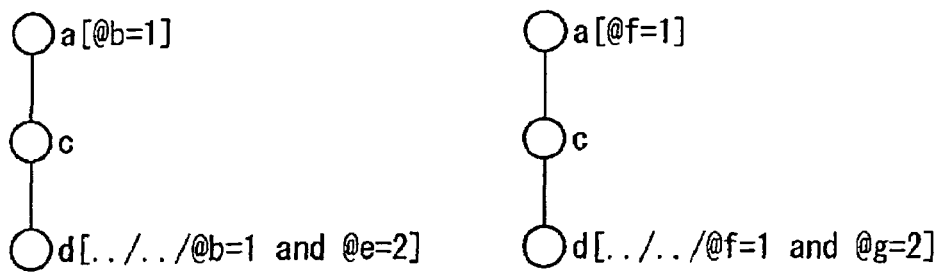
FIG.16
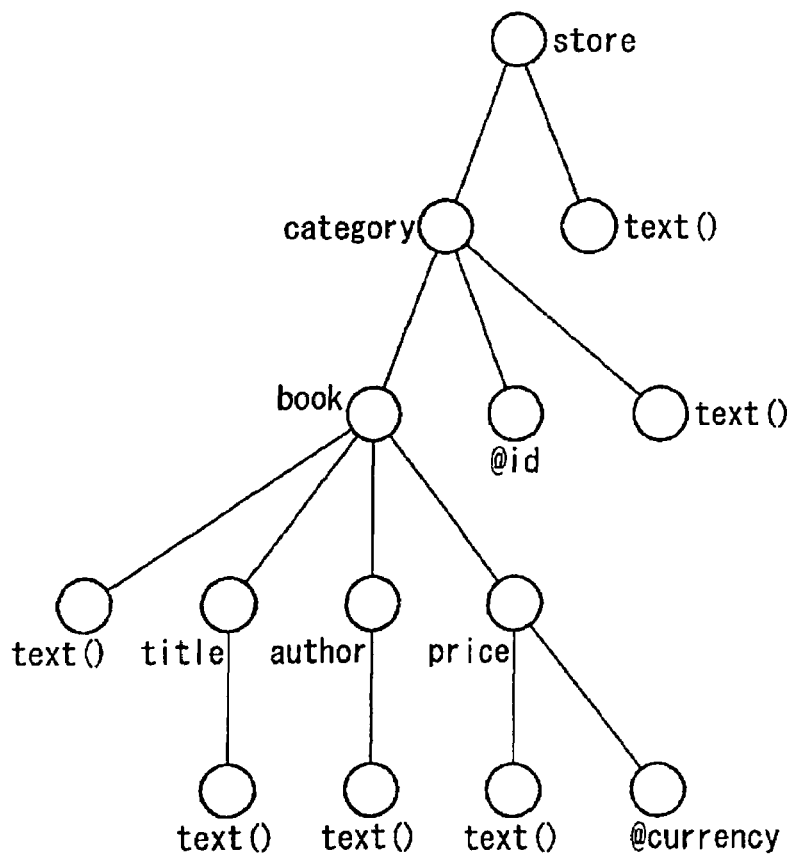

```
<store>
    <category id='Java'>
        <book>
            <title>Java Script</title>
            <author>David Flanagan</author>
            <price currency='$'>31.47</price>
        </book>
        <book>
            <title>Head First Java</title>
            <author>Bert Bates</author>
            <author>Kathy Sierra</author>
            <price currency='$'>27.97</price>
        </book>
    </category>
    <category id='Business'>
        <book>
            <title>Microsoft Project 2000 Step by Step</title>
            <author>Carl S. Chatfield</author>
            <author>Timothy D. Johnson</author>
            <price currency='$'>20.99</price>
        </book>
        <book>
            <title>Advanced modelling in finance using Excel and VBA</title>
            <author>Mary Jackson</author>
            <author>Mike Staunton</author>
            <price currency='$'>45.50</price>
        </book>
    </category>
</store>
```

```
<store>
  <category id='Java'>
    <book>
      <title>Java Script</title>
      <author>David Flanagan</author>
      <price currecny='$'>31.47</price>
    </book>
    <book>
      <title>Head First Java</title>
      <author>Bert Bates</author>
      <author>Kathy Sierra</author>
      <price currency='$'>27.97</price>
    </book>
  </category>
  <category id='Business'>
    <book>
      <title>Advanced modelling in finance using Excel and VBA</title>
      <author>Mary Jackson</author>
      <author>Mike Staunton</author>
      <price currency='$'>45.50</price>
    </book>
  </category>
</store>
```

(b)

```
<store>
  <category id='Java'>
    <book>
      <title>Java Script</title>
      <author>David Flanagan</author>
      <price currency='$'>31.47</price>
    </book>
  </category>
</store>
```

FIG.22

```
<store>
    <category id='Java'>
        <book>
            <title>Java Script</title>
            <author>David Flanagan</author>
            <price currency='$'>31.47</price>
        </book>
    </category>
    <category id='Business'>
        <book>
            <title>Advanced modelling in finance using Excel and VBA</title>
            <author>Mary Jackson</author>
            <author>Mike Staunton</author>
            <price currency='$'>45.50</price>
        </book>
    </category>
</store>
```

FIG.23

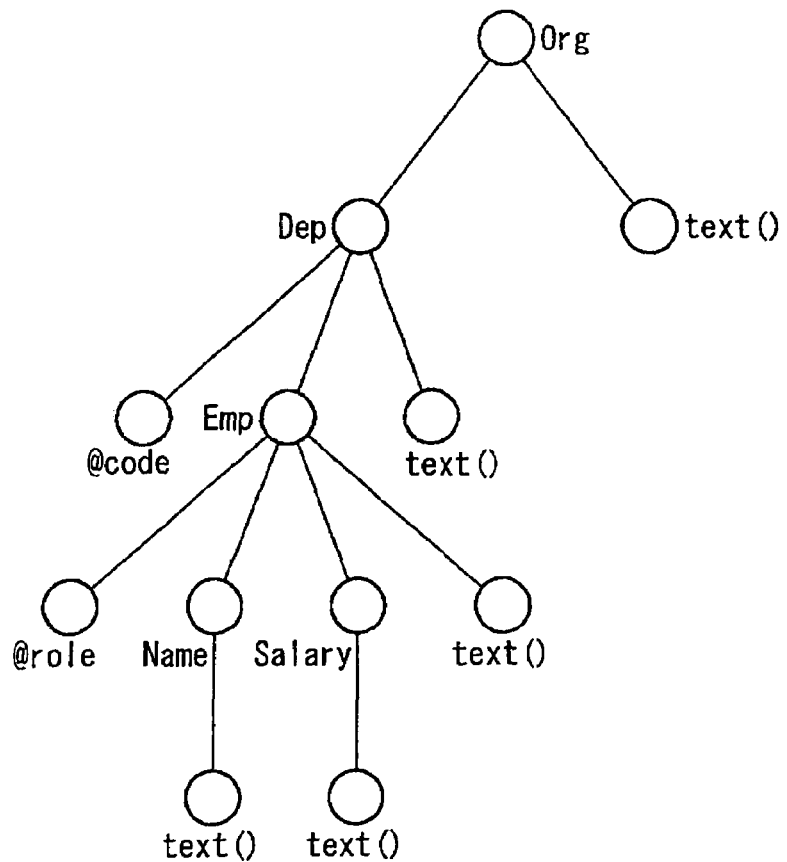

```
<Org>
    <Dep code='SV&SW'>
        <Emp>
            <Name>A. B. </Name>
            <Salary>500000</Salary>
        </Emp>
        <Emp role='GL'>
            <Name>C. D. </Name>
            <Salary>400000</Salary>
        </Emp>
        <Emp>
            <Name>E. F. </Name>
            <Salary>300000</Salary>
        </Emp>
    </Dep>
    <Dep code='S&S'>
        <Emp role='MG'>
            <Name>G. H. </Name>
            <Salary>500000</Salary>
        </Emp>
        <Emp role='GL'>
            <Name>I. J. </Name>
            <Salary>400000</Salary>
        </Emp>
        <Emp>
            <Name>K. L. </Name>
            <Salary>300000</Salary>
        </Emp>
    </Dep>
    <Dep code='S&T'>
        <Emp role='MG'>
            <Name>M. N. </Name>
            <Salary>500000</Salary>
        </Emp>
        <Emp role='GL'>
            <Name>O. P. </Name>
            <Salary>400000</Salary>
        </Emp>
        <Emp>
            <Name>Q. R. </Name>
            <Salary>300000</Salary>
        </Emp>
    </Dep>
</Org>
```

FIG.25
(a)
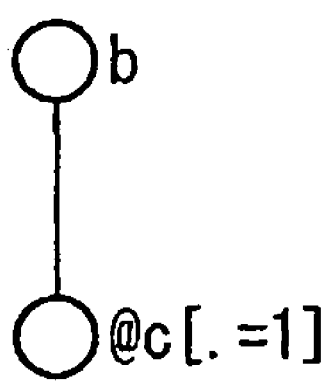 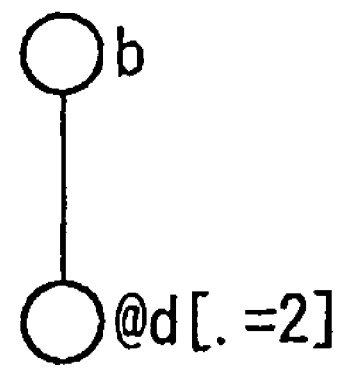
(b)
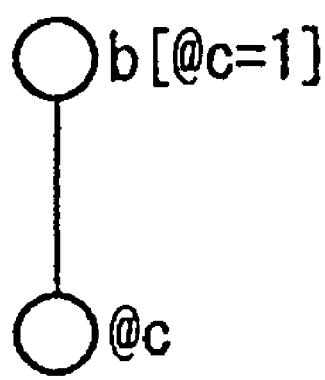 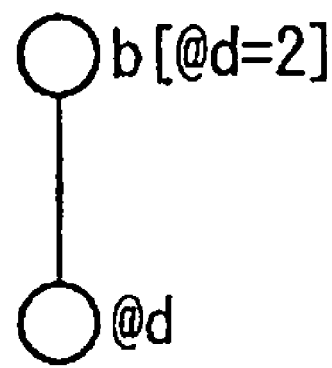

```
<Org>
    <Dep code='S&T'>
        <Emp role='MG'>
            <Name>M.N.</Name>
            <Salary>500000</Salary>
        </Emp>
        <Emp role='GL'>
            <Name>O.P.</Name>
            <Salary>400000</Salary>
        </Emp>
        <Emp>
            <Name>Q.R.</Name>
            <Salary>300000</Salary>
        </Emp>
    </Dep>
</Org>
```

SETTING APPARATUS, SETTING METHOD, PROGRAM, AND RECORDING MEDIUM

BACKGROUND OF THE INVENTION

The present invention relates to a setting apparatus, a setting method, a program, and a recording medium. In particular, the present invention relates to a setting apparatus, a setting method, a program, and a recording medium for setting authorization for or prohibition of access to data.

In recent years, a language such as XML describing information by structuralizing the information into a hierarchical structure has gained attention. The XML has been widely used in various fields. For example, a clinical chart, a contract document and the like are typical applications of the XML. In such a document, it is desirable that authorization for or prohibition of access can be set not only on the entire document but also individually on a plurality of pieces of information included in one document. For example, in a case of a clinical chart, although there is no problem even if many people are authorized to access information concerning a date of diagnosis and treatment, it is not preferable that many people be authorized to access information concerning a name of illness.

Heretofore, as one of technologies for setting authorization for or prohibition of access to information with a hierarchical structure, a file system for managing a file or folder stored in a storage device has been proposed. For example, with one operation received from a user, a file system of Windows XP (registered trademark) can prohibit access to a selected folder and all files/folders at lower level in the hierarchy than that of the selected folder. Moreover, a file system of UNIX (registered trademark) or the like can set authorization for or prohibition of access to a file in accordance with whether or not a person who accesses the file is a maker of the file.

Furthermore, Tivoli Access Manger is known as a system for setting authorization for or prohibition of access to a server or an application program. According to this system, authorization for or prohibition of access can be set on each of the server and application program.

A description of publicly-known prior art documents is omitted because the existence of publicly-known prior art documents has not been confirmed at the present time.

However, it is difficult for an administrator of a structured document to properly set authorization for or prohibition of access to each of a plurality of pieces of information included in the document. For example, in an example of a clinical chart, there are some occasions when, although an administrator prohibits access to a name of illness, the administrator forgets to prohibit access to a diagnosis history located at a lower level in hierarchy than that of the name of illness. Such a disadvantage is likely to occur particularly when the structure of a document is complicated or when conditions of authorization for access are complicated, and this is problematic. Moreover, heretofore, in order to properly set authorization for or prohibition of access to each of a plurality of pieces of information, it has been necessary for an administrator to perform many operations. For example, in a case of the above-described Tivoli Access Manager, it has been necessary for an administrator to perform no less than nineteen operations in order to make predetermined setting.

In this connection, it is an object of the present invention to provide a setting apparatus, a setting method, a program, and a recording medium which are capable of solving the above-described problems. This object is achieved by the combination of the features described in each independent claim of the appended claims. Further, the dependent claims specify more advantageous specific examples of the present invention.

SUMMARY OF THE INVENTION

In order to solve the aforementioned problems, a first aspect of the present invention provides a setting apparatus, a setting method, a program, and a recording medium on which the program is recorded. Here, the setting apparatus sets any of authorization for and prohibition of access to data with a hierarchical structure, and comprises: an object selection unit for selecting at least one object from a plurality of objects constituting the hierarchical structure; a pattern selection unit for selecting at least one pattern from a plurality of patterns, each of which determines a relative position in the hierarchical structure to the object selected by the object selection unit; and an access control policy setting unit for setting any of authorization for and prohibition of access to the object selected by the object selection unit and each of objects at the relative position to the selected object, the relative position being determined by the pattern selected by the pattern selection unit.

It is noted that the above-described summary of the invention does not list all features necessary for the present invention and that subcombinations of these features can be also included in the present invention.

The present invention makes it possible to efficiently set authorization for or prohibition of access or the like to data with a hierarchical structure.

BRIEF DESCRIPTION OF THE DRAWINGS

For a more complete understanding of the present invention and the advantages thereof, reference is now made to the following description taken in conjunction with the accompanying drawings.

FIG. 5 shows an example of the data structure of an object state table storing unit 300.

FIGS. 6A and 6B are diagrams for explaining a first pattern.

FIGS. 7A and 7B are diagrams for explaining a second pattern.

FIGS. 8A and 8B are diagrams for explaining a third pattern.

FIGS. 9A and 9B are diagrams for explaining a fourth pattern.

FIGS. 15A and 15B are diagrams for explaining a process in which the policy generation system 10 sets a combined condition.

FIG. 16 shows an example (third example) of an abstract structure of a structured document stored in the structured-document storage 100.

FIG. 17 shows an example (third example) of a structured document stored in the structured-document storage 100.

FIGS. 19A and 19B show examples (third example) of objects accessed in accordance with access control policies set by the policy generation system 10.

FIG. 22 shows an example (fourth example) of objects accessed in accordance with access control policies set by the policy generation system 10.

FIG. 23 shows an example (fifth example) of an abstract structure of a structured document stored in the structured-document storage 100.

FIG. 24 shows an example (fifth example) of a structured document stored in the structured-document storage 100.

FIGS. 25A and 25B are diagrams for explaining other process in which the policy generation system 10 sets a combined condition.

DETAILED DESCRIPTION OF THE PREFERRED EMBODIMENT

Hereinafter, the present invention will be described by way of an embodiment. However, the embodiment below is not intended to limit the invention commensurate with the scope of the claims, and all of a combination of features described in the embodiment are not necessarily indispensable for solving means of the invention.

Figure 1:
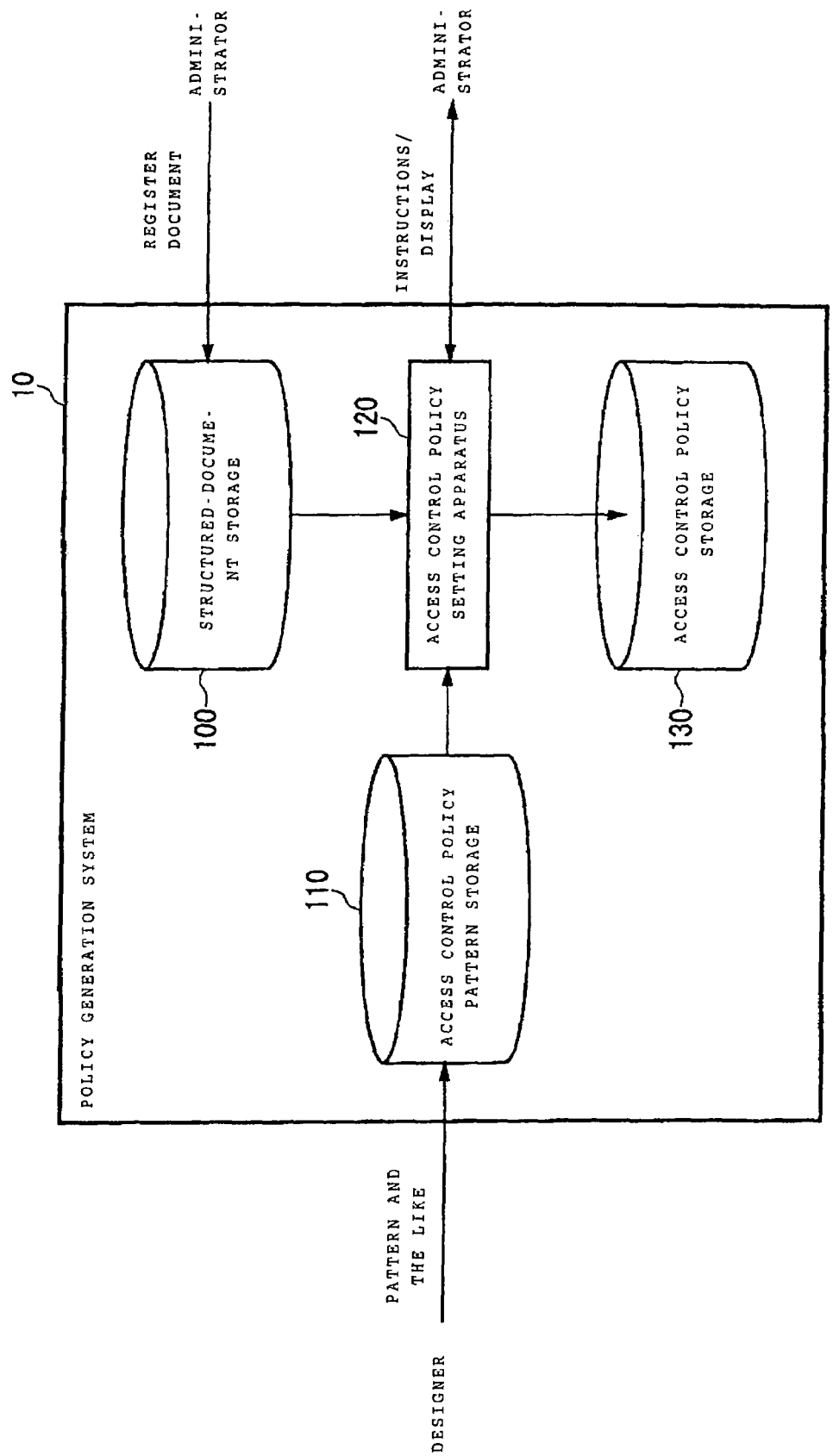
FIG. 1 is a block diagram of a policy generation system 10.

FIG. 1 is a block diagram of a policy generation system 10. The policy generation system 10 is intended to efficiently set access control policies in which authorization for or prohibition of access or the like is determined for data having a hierarchical structure. The policy generation system 10 includes a structured-document storage 100, an access control policy pattern storage 110, an access control policy setting apparatus 120, and an access control policy storage 130. The structured-document storage 100 receives instructions from an administrator, and stores data having a hierarchical structure, e.g., a structured document of XML or the like. Instead of this, the structured-document storage 100 may acquire a structured document from other storage and store the structured document. The access control policy pattern storage 110 stores various kinds of data necessary to set authorization for or prohibition of access to each of a plurality of objects constituting a hierarchical structure. Such data may be registered by a designer.

Upon acquiring the plurality of objects constituting the hierarchical structure from the structured-document storage 100, the access control policy setting apparatus 120 selects at least one object among the plurality of objects based on instructions from the administrator. Then, the access control policy setting apparatus 120 selects at least one pattern among a plurality of patterns, each of which determines relative positions to the selected object in the hierarchical structure. The access control policy setting apparatus 120 sets authorization for or prohibition of access to each of the relevant object and other objects located at the relative positions to the relevant object, which relative positions are determined by the pattern, and stores the setting result in the access control policy storage 130. This allows the administrator to efficiently set authorization for or prohibition of access or the like without performing complex operations for selecting setting target objects one by one.

Incidentally, in the description of the present embodiment, the administrator means a person who sets or changes access control policies and thereby manages the structured document so that the structured document can be accessed only by rightful persons with access authority. Further, the designer means a person who registers data enabling the administrator to appropriately and efficiently set access control policies. Moreover, an access control policy of an object includes an object state, which indicates that access to the object is authorized or prohibited, and a condition for authorizing the access.

Figure 2:
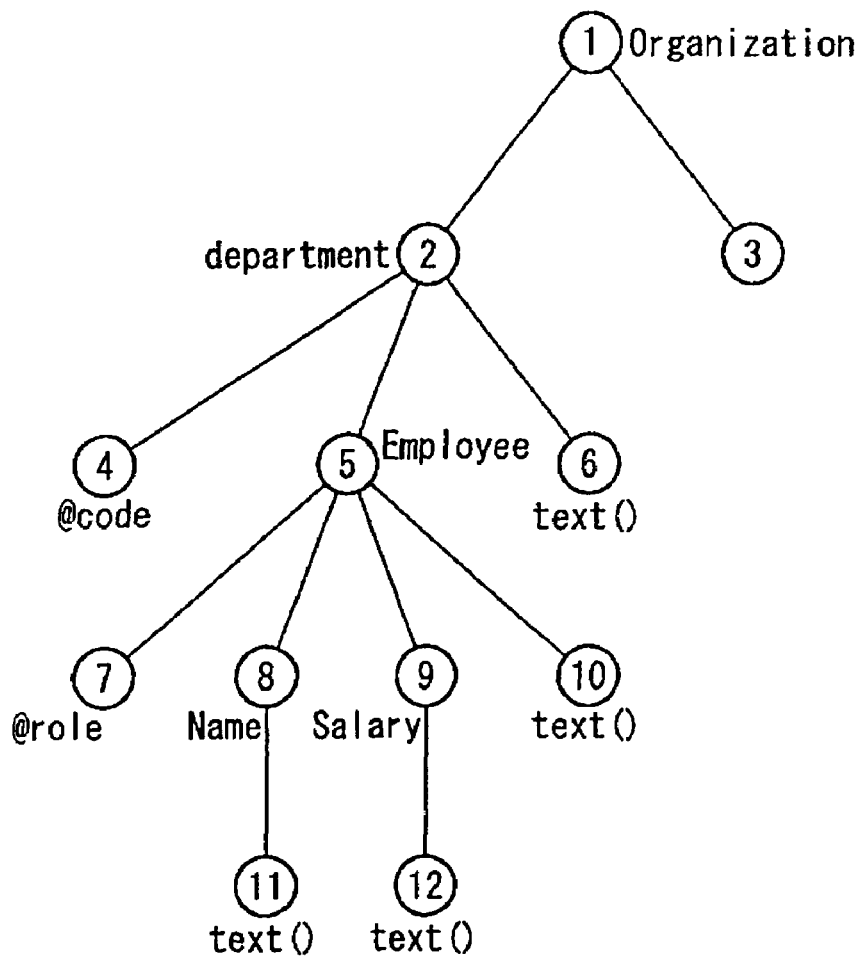
FIGS. 2A and 2B show an example (first example) of data stored in a structured-document storage 100.

FIGS. 2A and 2B show an example (first example) of data stored in the structured-document storage 100. FIG. 2A shows data actually stored in the structured-document storage 100. The structured-document storage 100 stores as data having a hierarchical structure a structured document described in XML or the like. Each of objects constituting the hierarchical structure is, for example, an element object containing a start tag indicating the start position of the description of information and an end tag indicating the end position of the description of the information. Specifically, in the present drawing, an element object contains <Organization>, which is a start tag, and </Organization>, which is an end tag.

To cite another example, each object may be an attribute object indicating an attribute of a start tag or an end tag. Specifically, in the present drawing, an attribute object is "code" indicating an attribute of <department>, which is a start tag. Further, in addition to this, the structured document may have a plurality of "Employee" tags, each of which corresponds to each employee to be managed.

FIG. 2B shows an abstract structure of the data stored in the structured-document storage 100. As shown in the present drawing, the plurality of objects constituting the hierarchical structure constitute, for example, a tree structure. Further, the root node of the tree structure represents the object at the highest level in hierarchy, and the leaf nodes of the tree structure represent the objects at the lowest level in hierarchy. For example, the root node is the abstract object "Organization," and leaf nodes are the abstract objects "@code,"

"@role," and the like. Moreover, objects existing between a start tag and an end tag constituting an element object are abstract objects at lower levels in hierarchy than that of an abstract object representing the element object in the abstract structure. It is noted that in the description below, attribute objects and abstract objects representing the attribute objects are represented by adding @ to the respective identifiers of the attribute objects in order to distinguish attribute objects and element objects.

Specifically, in the present drawing, the element object containing the start tag <Organization> and the end tag </Organization> is represented as the abstract object "Organization." Further, other tags and the like described between these start and end tags are represented as abstract objects at lower levels in hierarchy than that of the abstract object "Organization." For example, the start tag <department> and the end tag </department> are described between the start tag <Organization> and the end tag </Organization>. Accordingly, the abstract object "department" representing these tags is an abstract object at a lower level in hierarchy than that of the abstract object "Organization."

Further, the abstract structure may be a structure newly generated as one object by combining a plurality of objects which are at the same relative position relative to the root node as an origin and which are of the same type. For example, in the case where a plurality of "Employee" tags are described between the start tag <department> and the end tag </department> in the structured document, the abstract structure may contain an abstract object "Employee" obtained by combining these "Employee" tags. In addition, in the abstract structure, text data of the structured document may be represented as "text( )," which indicates the text data is text data. In the description below, each abstract object is represented by path expression which indicates the relative position of the relevant object using as an origin an abstract object represented as a root node. Specifically, the abstract object "department" is represented as /Organization/department.

Moreover, in the description below, an example in which the policy generation system 10 sets authorization for or prohibition of access to each abstract object will be described. It is noted that instead of this, the policy generation system 10 may make the setting not for each abstract object but directly for each object of the structured document. Accordingly, in the description below, unless otherwise noted, objects or abstract objects are simply referred to as objects in the case where each of objects and abstract objects is described. Further, objects passed in order by a route from a given object to an object represented as a root node are referred to as ancestor objects of the given object. Meanwhile, objects passed in order by routes from a given object to objects represented as leaf nodes are referred to as descendant objects of the given object.

Instead of the example of the present drawing, the data having a hierarchical structure may be a document described in SGML, HTML, or the like. In this case, each object may contain start and end tags, or may be an attribute similarly to the case of XML. To cite still another example, the data having a hierarchical structure may be data recorded on a file system of a storage device. In this case, each object is a file or a folder. Further, a file contained in a given folder is an object at a lower level in hierarchy than that of an object representing the given folder.

Figure 3:
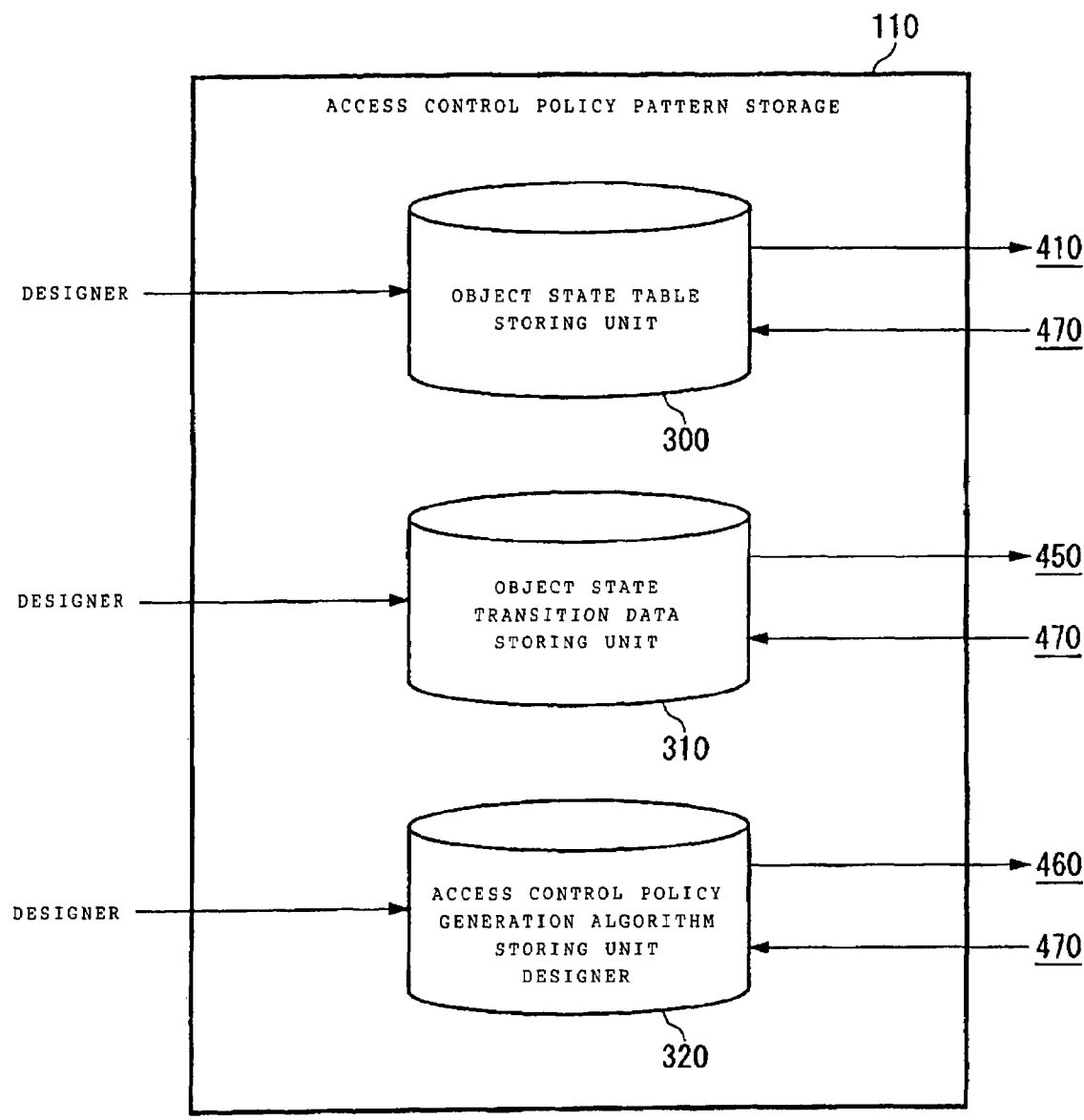
FIG. 3 is a block diagram of an access control policy pattern storage 110.
Figure 4:
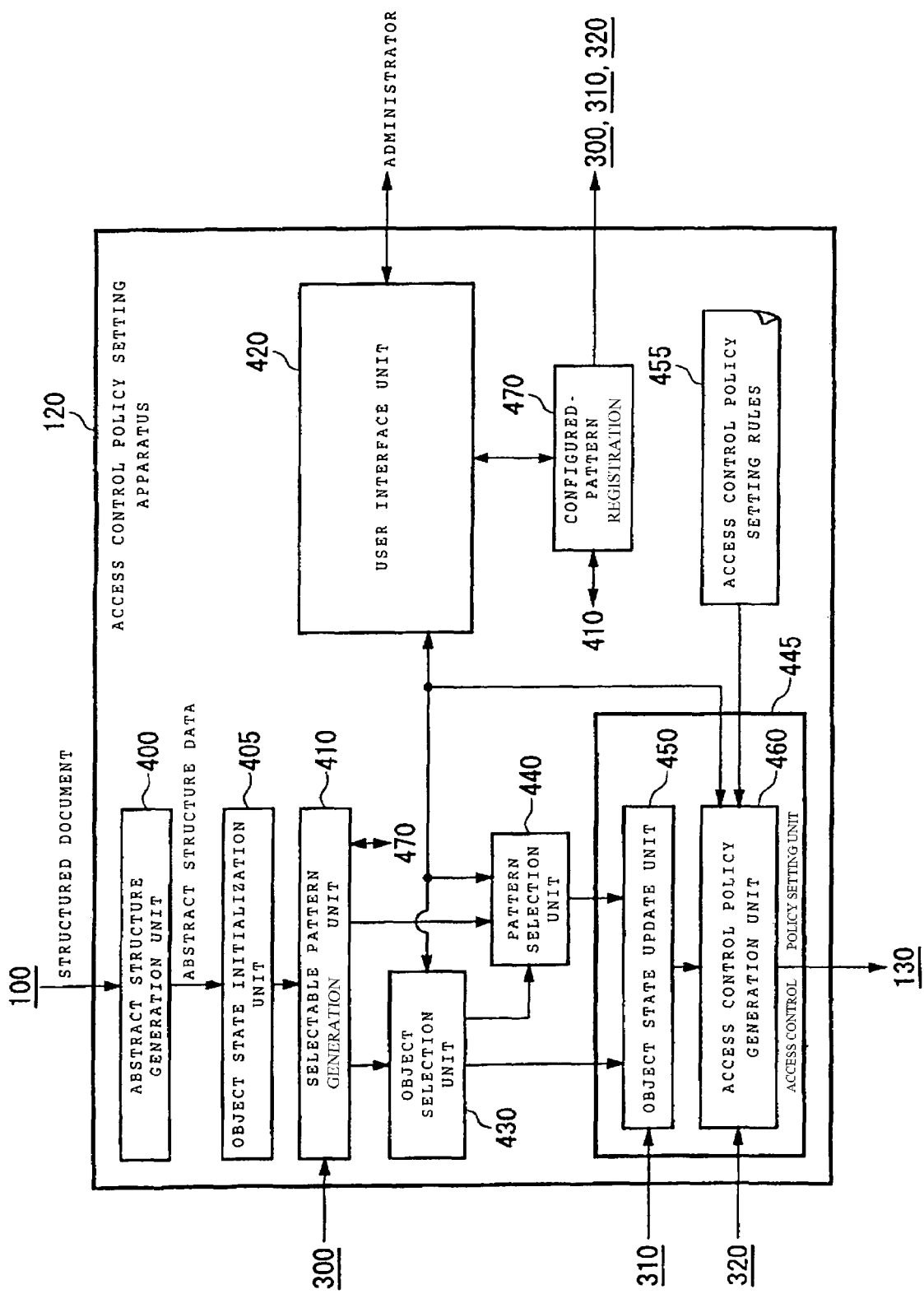
FIG. 4 is a block diagram of an access control policy setting apparatus 120.

FIG. 3 is a block diagram of the access control policy pattern storage 110. FIG. 4 is a block diagram of the access control policy setting apparatus 120. Both drawings will be described. The access control policy pattern storage 110 has an object state table storing unit 300, an object state transition data storing unit 310, and an access control policy generation algorithm storing unit 320. The access control policy setting apparatus 120 has an abstract structure generation unit 400, an object state initialization unit 405, a selectable pattern generation unit 410, a user interface unit 420, an object selection unit 430, a pattern selection unit 440, an access control policy setting unit 445, access control policy setting rules 455, and a configured-pattern registration unit 470.

Upon receiving the structured document from the structured-document storage 100, the abstract structure generation unit 400 generates an abstract structure by analyzing the structure of the received structured document, and transmits abstract structure data indicating the abstract structure to the object state initialization unit 405. Specifically, for each object of the structured document, the abstract structure generation unit 400 generates an abstract object representing the type and the like of the object. To cite an example, for each object, if the object is an element object, the abstract structure generation unit 400 may generate, as an abstract object representing the type of the element object, the name of a tag of the element object.

Then, the abstract structure generation unit 400 generates a hierarchical structure (referred to as an abstract structure in the description below) among the abstract objects based on the inclusion relation among the tags in the structured document. Specifically, the abstract structure generation unit 400 generates an abstract structure by setting, as descendant objects of an abstract object representing a given start tag and the corresponding end tag, abstract objects representing information described between the start and end tags. Furthermore, the abstract structure generation unit 400 may generate one abstract object by combining a plurality of objects which are located at the same relative position to the root node as an origin in the hierarchical structure and which are of the same type.

The object state initialization unit 405 sets the object state of each abstract object generated by the abstract structure generation unit 400 to an initial state, and transmits the abstract structure with the setting result to the selectable pattern generation unit 410. For example, the initial state is a state in which access is prohibited. Then, based on data acquired from the object state table storing unit 300 and the object states already set for the plurality of objects, the selectable pattern generation unit 410 generates patterns capable of being selected by the pattern selection unit 440, and transmits the generation result to the pattern selection unit 440. Further, the selectable pattern generation unit 410 transmits the received abstract structure data to the object selection unit 430.

It is noted that in the case where the selectable pattern generation unit 410 has received instructions from the configured-pattern registration unit 470 to newly register a selectable pattern, the selectable pattern generation unit 410 may add the newly registered pattern to the selectable patterns.

The object selection unit 430 displays the plurality of objects as, for example, an image representing the structure thereof, to the administrator through the user interface unit 420. Then, upon receiving instructions from the administrator through the user interface unit 420, the object selection unit 430 selects at least one object among the plurality of objects based on the instructions. The object selection unit 430 transmits the selection result with the abstract structure to the access control policy setting unit 445. Further, the object selection unit 430 transmits the selection result to the pattern selection unit 440.

Based on the selectable patterns received from the selectable pattern generation unit 410, the pattern selection unit 440 decides selectable patterns for the object selected by the object selection unit 430. Then, the pattern selection unit 440 displays the decided patterns to the administrator through the user interface unit 420 by, for example, formatting the patterns in a menu format in which the patterns are listed. Then, the pattern selection unit 440 selects at least one pattern based on instructions received from the administrator through the user interface unit 420.

The access control policy setting unit 445 has an object state update unit 450 and an access control policy generation unit 460. The object state update unit 450 acquires, from the object state transition data storing unit 310, information indicating relative positions in the hierarchical structure which are determined by the pattern selected by the pattern selection unit 440. Then, the object state update unit 450 sets an object state for each of objects located at the relative positions to the object selected by the object selection unit 430, which relative positions have been acquired from the object state transition data storing unit 310. The object state update unit 450 transmits the setting result with the abstract structure to the access control policy generation unit 460.

Based on instructions received from the administrator through the user interface unit 420, the access control policy generation unit 460 further sets access control conditions, each of which is a condition for authorizing or prohibiting access to each of the objects located at the relative positions to the object selected by the object selection unit 430, which relative positions are determined by the pattern selected by the pattern selection unit 440.

At this time, in the case where a plurality of different access control policies are set for a given object, the access control policy generation unit 460 may generate and set one access control policy obtained by combining these access control policies based on the access control policy setting rules 455. In this case, the access control policy generation unit 460 may inquire of the administrator as to a combining method if necessary. Further, the access control policy generation unit 460 may acquire an execution module for realizing a process of setting an access control policy from the access control policy generation algorithm storing unit 320 and execute the execution module. Then, the access control policy generation unit 460 formats the setting result in a predetermined file format and stores the setting result in the access control policy storage 130.

The configured-pattern registration unit 470 acquires, from the selectable pattern generation unit 410, patterns capable of being selected by the pattern selection unit 440. Then, the configured-pattern registration unit 470 displays these patterns to the administrator through the user interface unit 420, and inquires of the administrator whether a configured pattern configured by selecting any of these patterns at least twice is registered or not. Then, in the case where the configured-pattern registration unit 470 has received instructions to register the configured pattern, the configured-pattern registration unit 470 instructs the selectable pattern generation unit 410 to register the configured pattern as a new pattern capable of being selected by the pattern selection unit 440. Further, the configured-pattern registration unit 470 may add information corresponding to the new pattern to the object state table storing unit 300, the object state transition data storing unit 310, and the access control policy generation algorithm storing unit 320.

FIG. 5 shows an example of the data structure of the object state table storing unit 300. The object state table storing unit 300 stores patterns capable of being selected by the pattern selection unit 440 in the case where the object selection unit 430 has selected each object, with the patterns related to the object state and the object type of the relevant object. For example, in the case where the object selection unit 430 has selected an element object in an initial state, the pattern selection unit 440 can select first, second, and fourth patterns. On the other hand, in this case, the pattern selection unit 440 cannot select a third pattern.

That is, the selectable pattern generation unit 410 can generate a plurality of patterns capable of being selected by the pattern selection unit 440 based on whether an object selected by the object selection unit 430 is either an element object or an attribute object, by referring to the object state table storing unit 300. Moreover, the selectable pattern generation unit 410 can generate a plurality of patterns capable of being selected by the pattern selection unit 440 based on a setting as to authorization for or prohibition of access, which setting has been already made for the object.

It is noted that an object type means the type of an object and, for example, refers to an element object, an attribute object, or the like. In addition to the above, an object type may refer to a text object, which is character information not including tag information. Subsequently, the first to fourth patterns will be described.

FIGS. 6A and 6B are diagrams for explaining the first pattern. FIG. 6A is a conceptual diagram of access control policies set in accordance with the first pattern. The object state transition data storing unit 310 contains, as one of selectable patterns, the first pattern in which access to each object on a route from an object selected by the object selection unit 430 to a root object represented as a root node is authorized.

For example, in the case where the object selection unit 430 has selected the diagonally-hatched object in the present drawing and where the pattern selection unit 440 has selected the first pattern, the access control policy setting unit 445 authorizes access to each object on the route from the relevant object to the root object, which route is represented by a thick line. It is noted that an object selected by the object selection unit 430 is referred to as a core object in the description below.

FIG. 6B is a state transition diagram of object states which transition in accordance with the first pattern. A core object in an initial state transitions to an authorized state in which access is authorized. Further, a core object in an authorized state does not transition and stays in the authorized state. It is noted that in the case where the object selection unit 430 has selected an object in a prohibited state in which access is prohibited, the pattern selection unit 440 cannot select the first pattern.

An ancestor object of the core object transitions from an initial state to an authorized state. Meanwhile, an ancestor object in an authorized state does not transition and stays in the authorized state. It is noted that in the case where the pattern selection unit 440 can select the first pattern, an ancestor object is in any one of an initial state and an authorized state but not in a prohibited state. Accordingly, a state transition from a prohibited state is not shown. A descendant object of the core object does not transition and stays in the state thereof, whether the descendant object is in an initial state, an authorized state, or a prohibited state.

FIGS. 7A and 7B are diagrams for explaining the second pattern. FIG. 7A is a conceptual diagram of access control policies set in accordance with the second pattern. The object state transition data storing unit 310 contains, as one of selectable patterns, the second pattern in which access to each object on routes from an object selected by the object selection unit 430 to a root object and leaf objects is authorized.

In the case where the object selection unit 430 has selected the core object in the present drawing and where the pattern selection unit 440 has selected the second pattern, the access control policy setting unit 445 authorizes access to each object on the routes from the core object to the root object and the leaf objects, which routes are represented by thick lines.

FIG. 7B is a state transition diagram of object states which transition in accordance with the second pattern. A core object in an initial state transitions to an authorized state in which access is authorized. Meanwhile, a core object in an authorized state does not transition and stays in the authorized state. It is noted that in the case where the object selection unit 430 has selected an object in a prohibited state, the pattern selection unit 440 cannot select the second pattern.

An ancestor object of the core object transitions from an initial state to an authorized state. Meanwhile, an ancestor object in an authorized state does not transition and stays in the authorized state. It is noted that in the case where the pattern selection unit 440 can select the second pattern, an ancestor object is in any one of an initial state and an authorized state but not in a prohibited state. Accordingly, a state transition from a prohibited state is not shown.

A descendant object transitions from an initial state to an authorized state. Meanwhile, a descendant object in an authorized state or a prohibited state does not transition and stays in the state thereof. That is, a descendant object which has changed to a prohibited state once does not transition to other state and stays in the prohibited state even in the case where the pattern selection unit 440 has selected the second pattern.

FIGS. 8A and 8B are diagrams for explaining the third pattern. FIG. 8A is a conceptual diagram of access control policies set in accordance with the third pattern. The object state transition data storing unit 310 contains, as one of selectable patterns, the third pattern in which access to each object on a route from an object selected by the object selection unit 430 to each leaf object represented as a leaf node is prohibited.

In the case where the object selection unit 430 has selected the core object in the present drawing and where the pattern selection unit 440 has selected the third pattern, the access control policy setting unit 445 prohibits access to each object on the route from the core object to each leaf object, which route is represented by a thick line.

FIG. 8B is a state transition diagram of object states which transition in accordance with the third pattern. A core object in an authorized state transitions to a prohibited state. It is noted that in the case where the object selection unit 430 has selected an object in an initial state or a prohibited state, the pattern selection unit 440 cannot select the third pattern. Accordingly, a state transition from an initial state or a prohibited state is not shown.

An ancestor object of the core object does not transition and stays in an authorized state. It is noted that a state transition from an initial state or a prohibited state is not shown, because an ancestor object is necessarily in an authorized state in the case where the pattern selection unit 440 can select the third pattern. A descendant object transitions from an authorized state to a prohibited state. Incidentally, a descendant object in a prohibited state does not transition and stays in the prohibited state.

FIGS. 9A and 9B are diagrams for explaining the fourth pattern. FIG. 9A is a conceptual diagram of access control policies set in accordance with the fourth pattern. The object state transition data storing unit 310 contains, as one of selectable patterns, the fourth pattern in which a condition for authorizing a user to access each object on routes from an object selected by the object selection unit 430 to objects represented as leaf nodes is set.

In the case where the object selection unit 430 has selected the core object in the present drawing and where the pattern selection unit 440 has selected the fourth pattern, the access control policy setting unit 445 sets a condition for authorizing access to each object on the routes from the core object to the leaf objects, which routes are represented by thick lines. Further, in this case, the access control policy setting unit 445 authorizes access to the ancestor object of the core object. It is noted that in the present embodiment, an object for which an access control condition for authorizing access is set is considered to be in an authorized state in terms of a state transition.

FIG. 9B is a state transition diagram of object states which transition in accordance with the fourth pattern. A core object in an initial state transitions to an authorized state in which a condition is set. A core object for which access is unconditionally authorized may also transition to an authorized state in which a condition is set. Further, an ancestor object in an initial state transitions to an authorized state. Moreover, a descendant object in an initial state transitions to an authorized state in which a condition is set. Furthermore, a descendant object for which access is unconditionally authorized may transition to an authorized state in which a condition is set. In addition, a descendant object in a prohibited state does not transition and stays in the prohibited state.

As described above, with the first to fourth patterns shown in FIGS. 6A to 9B, access to objects at higher levels in hierarchy can be authorized whenever access to objects at lower levels in hierarchy is authorized. This makes it possible to save the labor of setting an access control policy for each object and to prevent the occurrence of a mismatch between access control policies.

Figure 10:
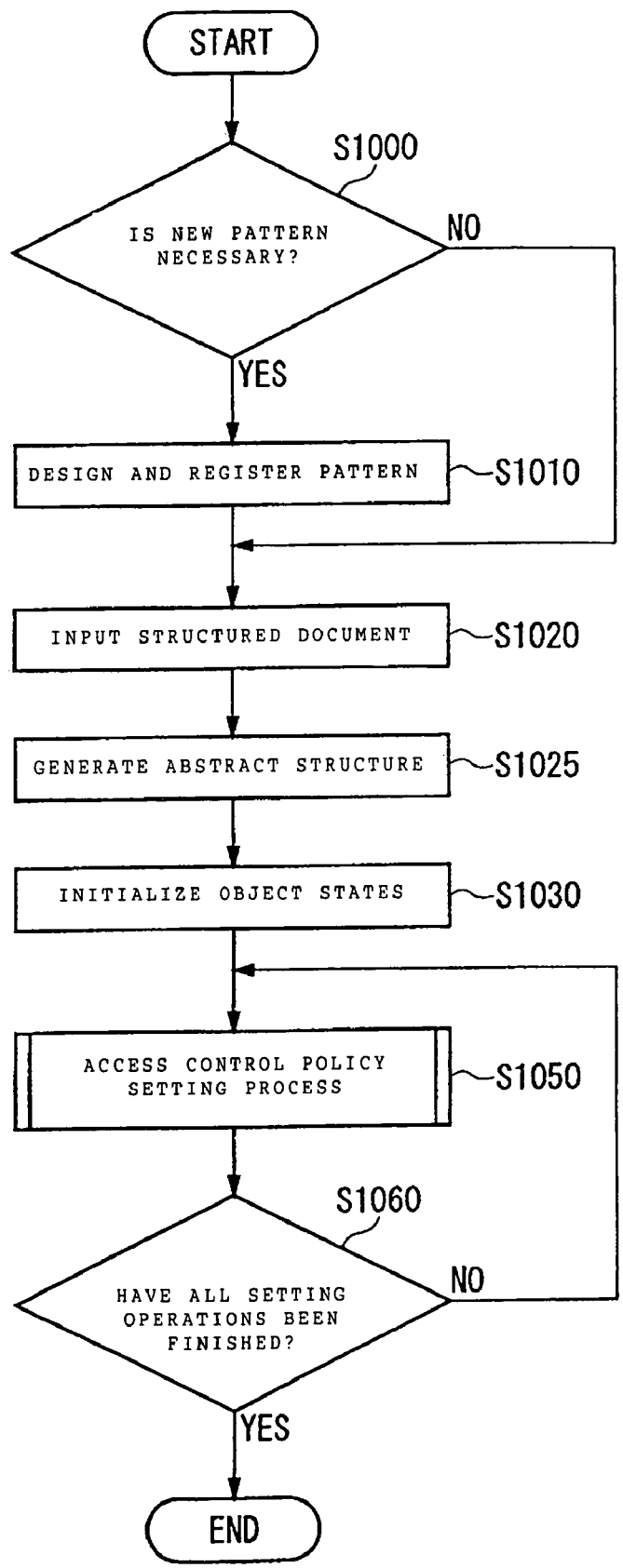
FIG. 10 shows an operation flow of the policy generation system 10.

FIG. 10 shows an operation flow of the policy generation system 10. The policy generation system 10 judges whether a new pattern is necessary or not (S1000). For example, in the case where the configured-pattern registration unit 470 has received instructions from the administrator to register a new pattern, the configured-pattern registration unit 470 may judge that a new pattern is necessary. Instead of this, in the case where the structured-document storage 100 has received instructions from the designer to register a new pattern, the structured-document storage 100 may judge that a new pattern is necessary. Even in the case where a new pattern has been judged to be unnecessary, the object selection unit 430 can select the first to fourth patterns.

In the case where a new pattern has been judged to be necessary (S1000: YES), for example, the configured-pattern registration unit 470 instructs the selectable pattern generation unit 410 to register a configured pattern (S1010). Further, the configured-pattern registration unit 470 may add various kinds of information designed corresponding to the pattern to the object state table storing unit 300, the object state transition data storing unit 310, and the access control policy generation algorithm storing unit 320. Upon receiving a structured document from the structured-document storage 100 (S1020), the abstract structure generation unit 400 generates an abstract structure by analyzing the structure of the received structured document (S1025).

The object state initialization unit 405 initializes the object state of each object constituting the abstract structure to an initial state (S1030). The access control policy setting unit 445 sets access control policies using selection results by the object selection unit 430, the pattern selection unit 440, and the like (S1050). In the case where all setting operations desired by the administrator have not been finished (S1060: NO), the access control policy setting unit 445 returns the process to S1050. On the other hand, in the case where all the setting operations have been finished (S1060: YES), the policy generation system 10 terminates the process.

Figure 11:
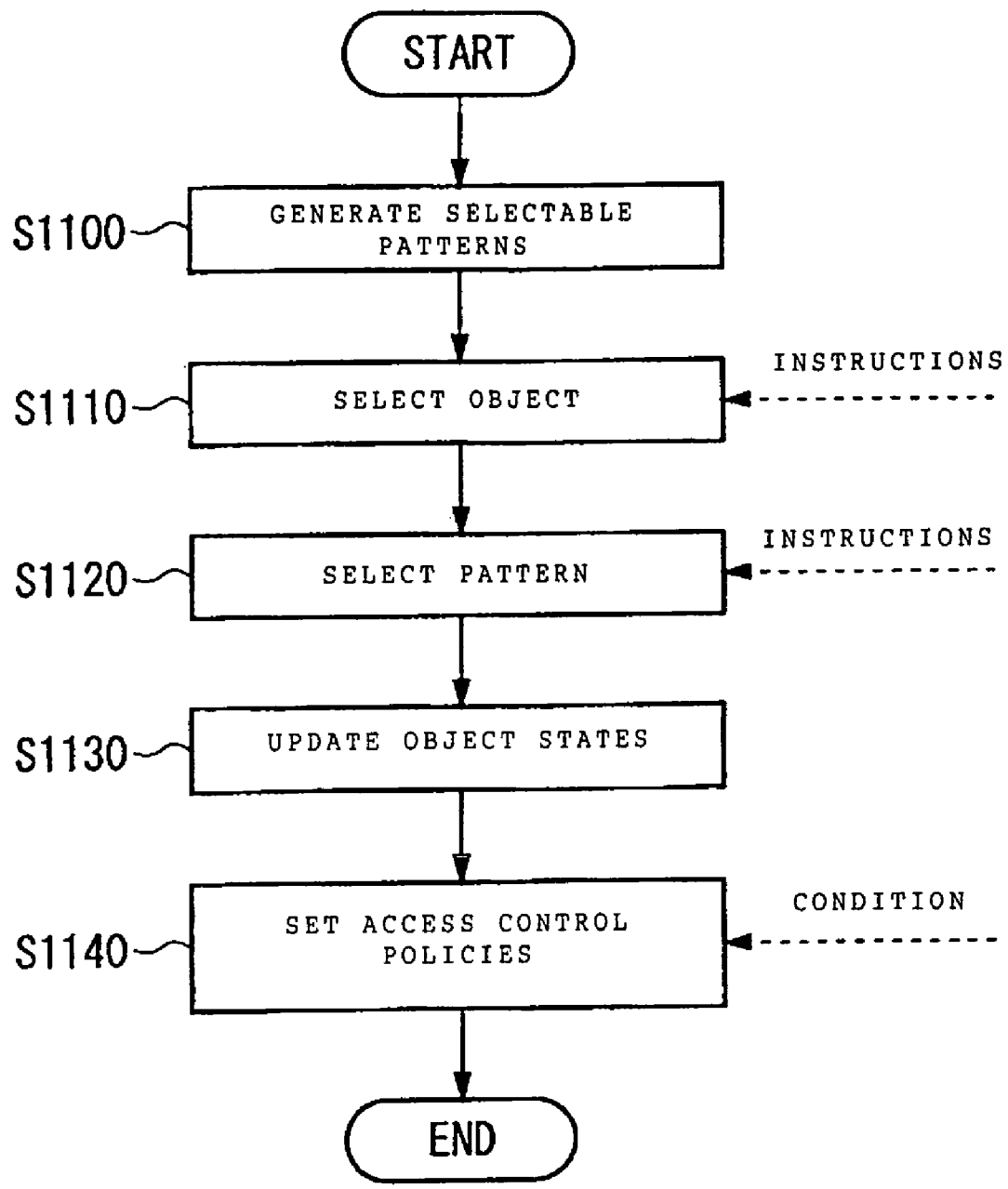
FIG. 11 shows details of the operation flow in S1050.

FIG. 11 shows details of the operation flow in S1050. The selectable pattern generation unit 410 generates a plurality of patterns capable of being selected in the case where each object is selected (S1100). The object selection unit 430 selects at least one object among the plurality of objects constituting the abstract structure based on instructions from the administrator (S1110).

Based on instructions from the administrator, the object state update unit 450 selects at least one pattern among the plurality of patterns capable of being selected for the selected object (S1120). Then, the object state update unit 450 updates the object state of each object based on the selected object and pattern (S1130). Further, the access control policy generation unit 460 may register, as a condition for authorizing access to each object, a condition inputted by the administrator (S1140).

Here, details of a process in which the access control policy generation unit 460 generates access control policies using information in the access control policy generation algorithm storing unit 320 and the access control policy setting rules 455 will be described. The access control policy generation algorithm storing unit 320 stores a program module for generating setting target objects, for which the access control policies are to be set, and access control conditions, in accordance with a predetermined notation. First, this notation will be described.

In the present embodiment, an access control policy is represented by the combination of an attribute (subject type) of an entity who performs access, the entity (subject) who performs access, an object which is a target of access, and information (mode action) indicating what process is authorized for the object.

The subject type indicates an attribute which a user should satisfy in order to be authorized to access the object. For example, the subject type may indicate a group to which the user should belong, or a job title, a position, or the like which the user should have.

The subject indicates a user who is to be authorized to access the object. For example, the subject indicates the identifier of the user. Further, the object is an object for which access is authorized or prohibited. In an access control policy, in order to identify an object, the position of the object in the abstract structure is described by path expression such as XPath or the like.

For example, /Org/Dep in XPath designates a descendant object "Dep" of an object "Org." Further, //Salary in XPath designates all objects of which names are "Salary." In addition, XPath notation makes it possible to designate an access control condition as well as an object using a predicate expression. For example, /Org/Dep[@code='S&S'] indicates an object "Dep" which satisfies the condition that the attribute "code" thereof is "S&S."

The mode action is represented by the combination of: instructions to authorize or prohibit a process performed on an object; and the type of the process. For example, the mode action indicates that any of read (r), write (w), update of contents (U), deletion (D), and traverse (T) is authorized (+) or prohibited (−). To cite an example, read authorization is represented as "+r."

Further, in addition to a setting (r) for authorizing the read of an object, a setting (R) for authorizing the read of the object and all the descendant objects thereof can also be designated as a type of a process.

Accordingly, for example, an access control policy is represented as <GROUP, A, /Org/Dep[@code='S&S'], +r>. This access control policy indicates that only a user "A" belonging to a group named "GROUP" can read only an object "Dep" of which attribute is "S&S."

The access control policy generation algorithm storing unit 320 stores the following four program modules for generating the above-described access control policies:

1. "upward" function
2. "downward" function
3. "generate_permit" function
4. "generate_deny" function In the case where the "upward" function has been executed, the access control policy generation unit 460 generates an access control policy in which a mode action of "+r" is set for each object on a route from a core object to a root object. In the case where the "downward" function has been executed, the access control policy generation unit 460 generates an access control policy in which a mode action of "+r" is set for each object on routes from a core object to leaf objects.

In the case where the "generate_permit" function has been executed, the access control policy generation unit 460 generates an access control policy in which a mode action of "+R" is set for a core object. Further, in the case where the "generate_deny" function has been executed, the access control policy generation unit 460 generates an access control policy of "−R" for a core object.

To cite a specific application example, in the case where the first pattern has been selected by the pattern selection unit 440, the access control policy generation unit 460 executes the "upward" function for a core object selected by the object selection unit 430. Further, in the case where the second pattern has been selected by the pattern selection unit 440, the access control policy generation unit 460 executes the "upward" function and the "downward" function for a core object selected by the object selection unit 430. In the case where the mode action is "+R" or "−R," or in the case where an object is designated by a specifier "//," the access control policy generation unit 460 may execute the "upward" function and the "generate_permit" function.

Moreover, in the case where the third pattern has been selected by the pattern selection unit 440, the access control policy generation unit 460 executes the "generate_deny" function for a core object selected by the object selection unit 430. Furthermore, in the case where the fourth pattern has been selected by the pattern selection unit 440, the access control policy generation unit 460 executes the "upward" function and the "downward" function for a core object selected by the object selection unit 430. In the case where the mode action is "+R," "−R," or the like, or in the case where an object is designated by a specifier "//," the access control policy generation unit 460 may execute the "upward" function and the "generate_permit" function.

Subsequently, the access control policy setting rules 455 will be described. In the case where other access control policy has been already set for a setting target object, the access control policy generation unit 460 selects and sets any of a newly-set access control policy and the already-set other access control policy based on the access control policy setting rules 455. For example, the access control policy setting rules 455 include a rule that prohibition of access is given higher priority than authorization for access. Further, the access control policy setting rules 455 include a rule that an access control policy in which an access control condition is set is given higher priority than an access control policy in which an access control condition is not set.

Accordingly, for example, the access control policy generation unit 460 cannot make a setting for authorizing access to an object for which access has been already prohibited. Further, the access control policy generation unit 460 cannot newly make a setting for unconditionally authorizing access to an object for which an access control condition has been already set.

Instead of this, the access control policy generation unit 460 may generate a combined condition obtained by combining a newly-set access control condition and an already-set other access control condition. In this case, the access control policy generation unit 460 may inquire of the administrator as to a combining method.

Hereinafter, the present embodiment will be described using specific examples.

Figure 12:
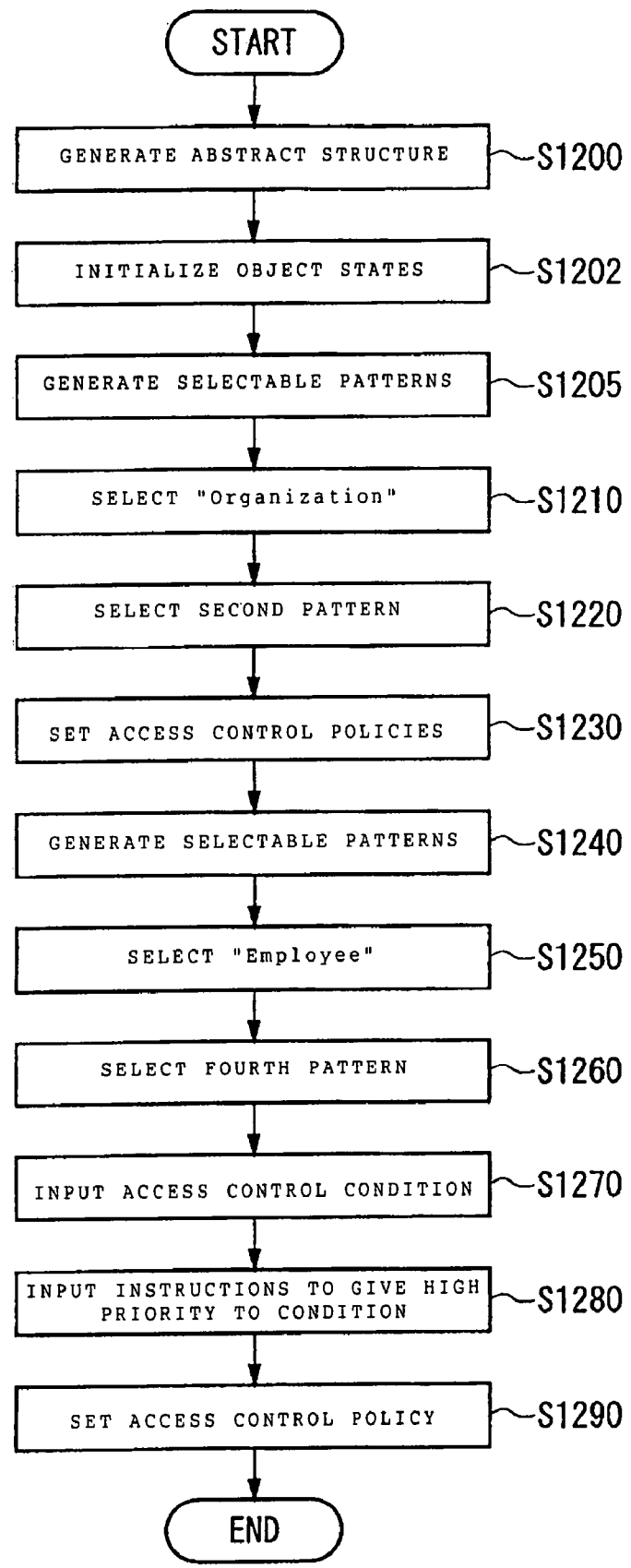
FIG. 12 shows an example (first example) of a process which the policy generation system 10 performs on a structured document.

FIG. 12 shows an example (first example) of a process which the policy generation system 10 performs on a structured document. The present drawing shows a process for authorizing an employee to read data concerning the employee and prohibiting the employee to read data concerning the others. First, the abstract structure generation unit 400 generates an abstract structure among objects based on the inclusion relation among tags in the structured document (S1200). Then, the object state initialization unit 405 initializes the object state of each object to an initial state (S1202). That is, the objects "Organization," "department," and the like are initialized to initial states.

Then, for each object, the selectable pattern generation unit 410 generates patterns capable of being selected by the pattern selection unit 440 in the case where the object is selected by the object selection unit 430 (S1205). The object selection unit 430 selects the object "Organization" based on instructions from the administrator (S1210). In this case, since the object "Organization" is an element object and in an initial state, patterns capable of being selected by the pattern selection unit 440 are the first, second, and fourth patterns.

The pattern selection unit 440 selects the second pattern (S1220). Further, the pattern selection unit 440 may decide what type of setting is made for each object, based on instructions from the administrator. For example, the pattern selection unit 440 decides to make, as one example among the types of settings, for example, a setting (r) for authorizing the reading of all the descendant objects of the core object.

Moreover, the pattern selection unit 440 may decide to make, as one example among the types of settings, a setting (R) for authorizing the reading of all the descendant objects of the core object and authorizing even the reading of objects newly added as descendant objects after setting. To cite still another example, the pattern selection unit 440 may make a setting for authorizing the writing of an object, or may make a setting for authorizing the update or deletion of an object.

Then, the access control policy setting unit 445 sets authorization for access to the object "Organization" and objects located at relative positions determined by the pattern selected for the object "Organization" by the pattern selection unit 440 (S1230). That is, the access control policy setting unit 445 sets authorization for access to the object "Organization" and all the descendant objects of this object. Thus, the following access control policies are generated:

```
<GROUP, emp, /Organization, +, r>
<GROUP, emp, /Organization/Department, +, r>
<GROUP, emp, /Organization/Department/@code, +, r>
<GROUP, emp, /Organization/Department/Employee, +, r>
<GROUP, emp, /Organization/Department/Employee/@role, +, r>
<GROUP, emp, /Organization/Department/Employee/Name, +, r>
<GROUP, emp, /Organization/Department/Employee/Name/text( ), +, r>
```
-continued
```
<GROUP, emp, /Organization/Department/Employee/Salary, +, r>
<GROUP, emp, /Organization/Department/Employee/Salary/text( ), +, r>
<GROUP, emp, /Organization/Department/Employee/text( ), +, r>
<GROUP, emp, /Organization/Department/text( ), +, r>
<GROUP, emp, /Organization/text( ), +, r>
```

This setting allows a user who belongs to a group named "GROUP" and whose user name is "emp" to read all the descendant objects of the object "Organization." Further, the user name "emp" may indicate not a specific user name but any of employees of a certain company. Thus, all pieces of information described between the start and end tags of the "Organization" tags can be read.

Subsequently, since all setting operations desired by the administrator have not been finished, the selectable pattern generation unit 410 again generates, for each object, patterns capable of being selected by the pattern selection unit 440 in the case where the object has been selected by the object selection unit 430 (S1240). The object selection unit 430 selects the object "Employee" based on instructions from the administrator (S1250). In this case, since the object "Employee" is an element object and in an authorized state, patterns capable of being selected by the pattern selection unit 440 are all of the first to fourth patterns.

The pattern selection unit 440 selects the fourth pattern (S1260). Then, the access control policy generation unit 460 receives the input of an access control condition for authorizing access to each object (S1270). For example, the access control policy generation unit 460 receives the input of, as an access control condition for the object "Employee" and the descendant objects thereof, a condition that the descendant object "Name" of the object "Employee" is the same as the user name of an accessing user. This condition is represented as, for example, a predicate expression [Name=$UserID].

Here, authorized states have been already set for the descendant objects of the object "Employee" in S1230. Accordingly, the access control policy generation unit 460 inquires of the administrator what setting should be made, i.e., whether access to each object is unconditionally authorized or authorized only in the case where the access control condition is satisfied (S1280). Based on instructions from the administrator, the access control policy generation unit 460 makes a setting for authorizing access only in the case where the access control condition is satisfied.

It is noted that the access control policy generation unit 460 may give high priority to a setting for authorizing access only in the case where the access control condition is satisfied, without receiving instructions from the administrator. That is, in the case where both unconditional access authorization and access authorization in the case where the access control condition is satisfied have been set for the same object, the access control policy generation unit 460 may authorize access to the object in the case where the access control condition is satisfied.

Through the above-described process, the access control policy generation unit 460 generates and sets the following access control policies (S1290):

```
<GROUP, emp, /Organization/Department/Employee[Name=$UserID], +, r>
```

-continued

```
<GROUP,                                              emp,
/Organization/Department/Employee[Name=$UserID]/@role, +, r>
   <GROUP,                                           emp,
/Organization/Department/Employee[Name=$UserID]/Name, +, r>
   <GROUP,                                           emp,
/Organization/Department/Employee[Name=$UserID]/Name/text( ),
+, r>
   <GROUP,                                           emp,
/Organization/Department/Employee[Name=$UserID]/Salary, +,
r>
   <GROUP,                                           emp,
/Organization/Department/Employee[Name=$UserID]/Salary/text
( ), +, r>
   <GROUP,                                           emp,
/Organization/Department/Employee[Name=$UserID]/text( ), +,
r>
```

It is noted that in the case where access control policies have been set for the same object in both S1230 and S1290, the setting in S1230 is overwritten with the setting in S1290.

Figure 13:
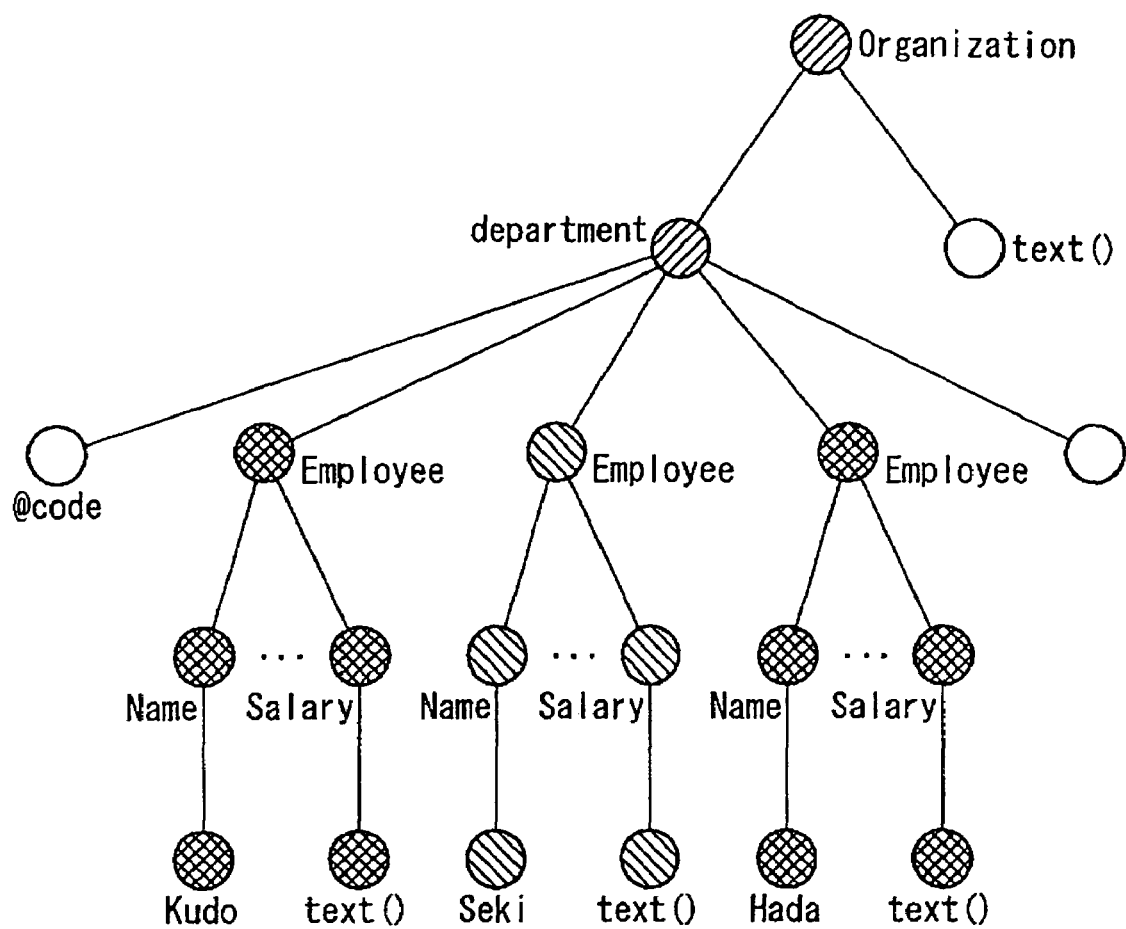
FIG. 13 shows, as a hierarchical structure of the structured document, an example (first example) of access control policies set by the policy generation system 10.

FIG. 13 shows, as a hierarchical structure of a structured document, an example (first example) of access control policies set by the policy generation system 10. All users who belong to "GROUP" and who are employees of a certain company can access objects "Organization" and "department." Further, a user whose user name is "Seki" can access a core object "Employee" of which descendant object "Name" is "Seki" and all descendant objects of the core object (diagonally hatched parts).

On the other hand, the user whose user name is "Seki" cannot access core objects "Employee" of which descendant objects "Name" are not "Seki" and all descendant objects of the core objects (cross-hatched parts).

Figure 14:
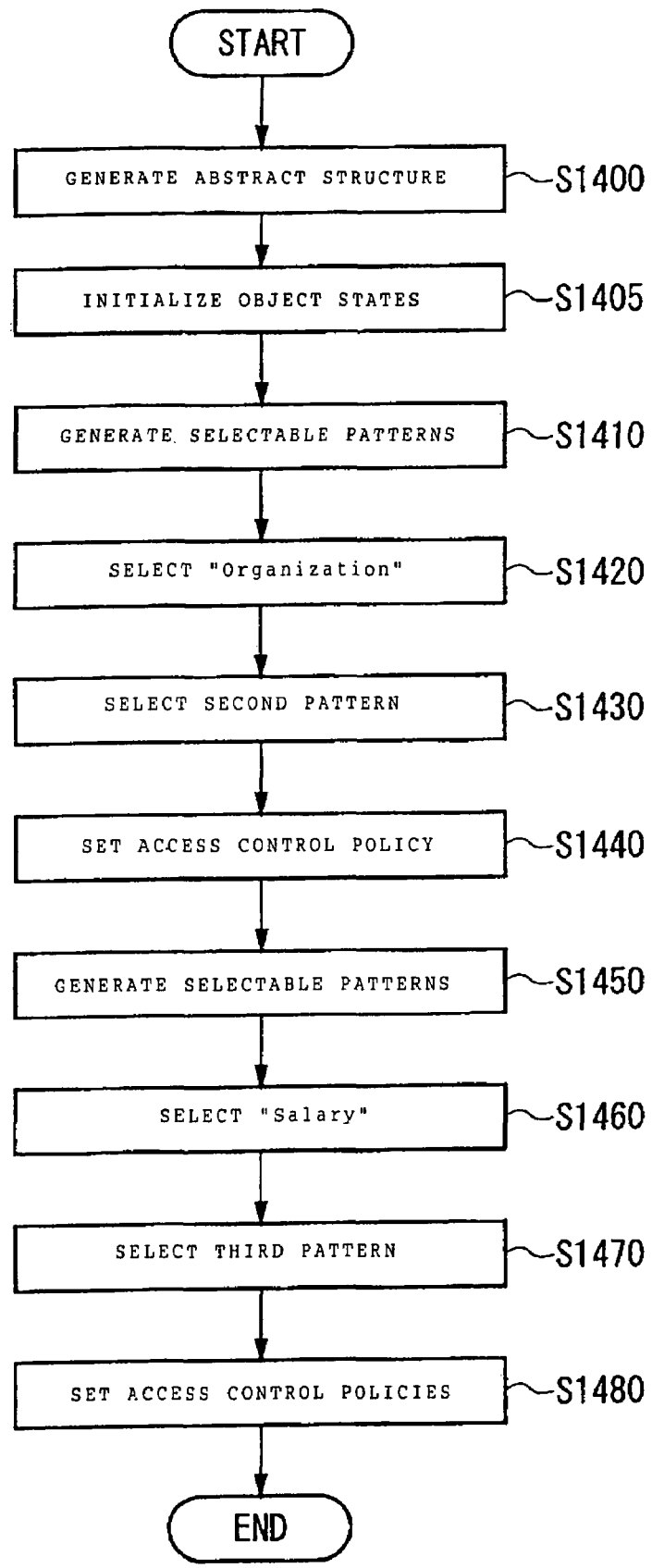
FIG. 14 shows an example (second example) of a process which the policy generation system 10 performs on a structured document.

FIG. 14 shows an example (second example) of a process which the policy generation system 10 performs on a structured document. The present drawing shows a process for prohibiting a group "Secretary" from reading "Salary" elements in the structured document shown in FIGS. 2A and 2B. The abstract structure generation unit 400 generates an abstract structure among objects based on the inclusion relation among tags in the structured document (S1400). Then, upon receiving abstract structure data, the object state initialization unit 405 initializes the object state of each object constituting the abstract structure to an initial state (S1405). Subsequently, for each object, the selectable pattern generation unit 410 generates patterns capable of being selected by the pattern selection unit 440 in the case where the object has been selected by the object selection unit 430 (S1410).

The object selection unit 430 selects the object "Organization" based on instructions from the administrator (S1420). Then, the pattern selection unit 440 selects the second pattern and selects the setting (R) based on instructions from the administrator (S1430). Subsequently, the access control policy setting unit 445 generates and sets an access control policy (S1440). Thus, for example, the following access control policy is generated:

<GROUP, Secretary, /Organization, +, R>

Next, since all setting operations desired by the administrator have not been finished, the selectable pattern generation unit 410 again generates, for each object, patterns capable of being selected by the pattern selection unit 440 in the case where the object has been selected by the object selection unit 430 (S1450). The object selection unit 430 selects the object "Salary" (S1460). Then, the pattern selection unit 440 selects the third pattern (S1470). Furthermore, the pattern selection unit 440 selects a setting for prohibiting the reading of all objects of which object names are "Salary."

In the description below, an identifier indicating all objects of which object names are "Salary" are represented as "//Salary." Further, a setting for prohibiting the reading of a given object and descendant objects of the given object is represented as a setting (−R).

Subsequently, the access control policy setting unit 445 generates and sets access control policies (S1480). Thus, for example, the following access control policies are generated:

<GROUP, Secretary, /Organization, +, R>
    <GROUP, Secretary, //Salary, −, R>

FIGS. 15A and 15B are diagrams for explaining a process in which the policy generation system 10 sets a combined condition. In the case where other access control condition has been already set for a setting target object for which an access control policy is to be set, the access control policy setting unit 445 sets a combined condition obtained by combining the newly-set relevant access control condition and the already-set other access control condition. For example, the access control policy setting unit 445 may set, as the combined condition, the disjunction or the conjunction of the relevant access control condition and the other access control condition.

However, in the case where other access control condition has been already set for both a given object and an ancestor object thereof, it is not appropriate that the disjunction or the conjunction is simply set. Accordingly, in the present drawing, a process in the case where when an access control condition is set for a given object and an ancestor object thereof, other access control condition has been already set for these objects, will be described. FIG. 15A shows access control conditions to be combined. These access control conditions are represented using predicate expressions as described below.

First, an already-set access control condition is represented as /a[@f=1]/c/d[@g=2]. This expression indicates a condition that an attribute "f" of an ancestor object "a" is 1 and that an attribute "g" of a descendant object "d" of the object "a" is 2. Further, a newly-set access control condition is represented as /a[@b=1]/c/d[@e=2]. Similarly, this expression indicates a condition that an attribute "b" of the ancestor object "a" is 1 and that an attribute "e" of the descendant object "d" of the object "a" is 2.

Here, the already-set access control condition indicates that access to the object "d" is authorized in the case where the attribute "f" of the object "a" is 1 and where the attribute "g" of the object "d" is 2. That is, authorization for access to the descendant object is premised on authorization for access to the ancestor object.

FIG. 15B shows an example of a combined condition generated by the access control policy setting unit 445. First, the access control policy setting unit 445 overwrites an access control condition for an ancestor object with an access control condition for a descendant object. For example, the access control policy setting unit 445 overwrites a[@f=1] with d[../../@f=1] in a predicate expression. Here, "../" indicates a direct ancestor object. Similarly, the access control policy setting unit 445 overwrites a[@b=1] with d[../../@b=1].

Next, the access control policy setting unit 445 generates a condition of the conjunction of the access control condition after overwriting and the already-set access control condition or the access control condition to be set. As a result, an access control condition for the object "d" becomes [../../@b=1 and @e=2], and an access control condition for the object "d" becomes [../../@f=1 and @g=2]. Finally, the access control policy setting unit 445 sets a combined condition obtained by combining these access conditions.

For example, for the object "d", the access control policy setting unit 445 may cause the administrator to select either a conjunction condition which satisfies both the newly-set relevant access control condition and the already-set other access control condition, or a disjunction condition which satisfies any of the relevant access control condition and the other access control condition, and may set the selected conjunction or disjunction condition as a combined condition.

As described above, while holding the meaning of an already-set access control condition, the access control policy setting unit 445 can add and set a new access control condition through the process shown in the present drawing. Further, the access control policy setting unit 445 can make an intention of the administrator easy to reflect by inquiring of the administrator as to a condition of a conjunction or a disjunction as needed. It is noted that a method of generating a combined condition is referred to as "pred_merger" in the description below.

FIG. 16 shows an example (third example) of an abstract structure of a structured document stored in the structured-document storage 100. FIG. 17 shows an example (third example) of a structured document stored in the stored-document storage 100. Using FIGS. 16 to 19, yet another example in which the policy generation system 10 sets access control policies will be described. The structured-document storage 100 stores a structured document beginning with a start tag <store> and ending with an end tag </store>.

A <category> tag, a <book> tag, and a <title> tag are described in this order between the start tag <store> and the end tag </store>. Accordingly, abstract objects "store," "/category," "book," and "title" become ancestor objects and descendant objects in this order. Further, since a plurality of <book> tags are described between the <category> tag and the </category> tag, the abstract structure generation unit 400 generates one abstract object "book" by combining these <book> tags.

Furthermore, since an <author> tag and a <price> tag are described between each <book> tag and the corresponding </book> tag, abstract objects "author" and "price" are descendant objects of the abstract object "book." Moreover, the abstract object "category" has, as a descendant object, an abstract object of an attribute object "id." Further, the abstract object "price" has, as a descendant object, an abstract object representing an attribute object "currency."

Figure 18:
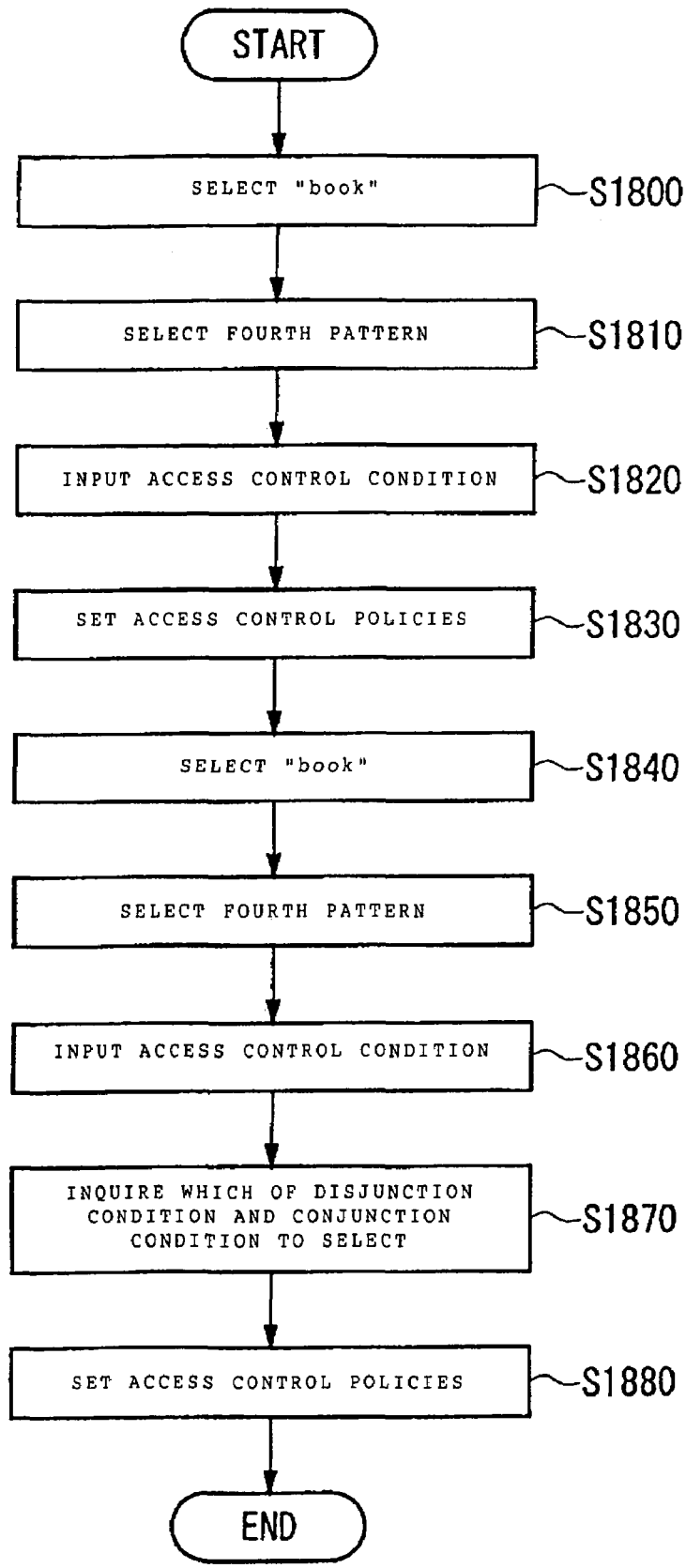
FIG. 18 shows an example (third example) of a process which the policy generation system 10 performs on the structured document.

FIG. 18 shows an example (third example) of a process which the policy generation system 10 performs on the structured document. A process by the abstract structure generation unit 400, an initialization process by the object state initialization unit 405, and a selectable pattern generation process by the selectable pattern generation unit 410 in the present example are approximately the same as the processes in S1400, S1405, and S1410 described in FIG. 14, respectively, and therefore will not be described in the present drawing.

The object selection unit 430 selects the object "book" as a core object (S1800). Then, the pattern selection unit 440 selects the fourth pattern (S1810). Subsequently, the access control policy generation unit 460 causes the administrator to input an access control condition (S1820). For instance, the access control policy generation unit 460 receives the input of, as an access control condition, a condition that the attribute object of the ancestor object "category" is "Java." This condition is represented as [../@id='Java' ] using a predicate expression.

Then, the access control policy generation unit 460 generates access control policies (S1830). The access control policies generated through the above-described process are shown below.

```
<USER, Seki, /store, +r>
<USER, Seki, /store/category, +r>
<USER, Seki, /store/category/book[../@id='Java'], +r>
<USER, Seki, /store/category/@id, +r>
<USER, Seki, /store/category/text( ), +r>
<USER,                                              Seki,
/store/category/book[../@id='Java']/text( ), +r>
 <USER, Seki, /store/category/book[../@id='Java']/title, +r>
    <USER,                                         Seki,
/store/category/book[../@id='Java']/author, +r>
    <USER, Seki, /store/category/book[../@id='Java']/price, +r>
    <USER,                                         Seki,
/store/category/book[../@id='Java']/title/text( ), +r>
    <USER,                                         Seki,
/store/category/book[../@id='Java']/author/text( ), +r>
    <USER,                                         Seki,
/store/category/book[../@id='Java']/price/text( ), +r>
    <USER,                                         Seki,
/store/category/book[../@id='Java']/price/@currency, +r>
```

Next, since all setting operations desired by the administrator have not been finished, the object selection unit 430 again selects the object "book" as a core object (S1840). Then, the pattern selection unit 440 selects the fourth pattern (S1850). Subsequently, the access control policy generation unit 460 causes the administrator to input an access control condition (S1860). For instance, the access control policy generation unit 460 receives the input of an access control condition that the descendant object "price" is more than 30 and that the attribute "currency" of the object "price" is $. This condition is represented as [price>30 and price/@currency='$'] using a predicate expression.

Since other access control condition has been already set for the object for which the access control condition is to be set, the access control policy generation unit 460 inquires of the administrator as to a method of generating a combined condition (S1870). More specifically, the access control policy generation unit 460 causes the administrator to select either a conjunction condition which satisfies both the newly-set relevant access control condition and the already-set other access control condition, or a disjunction condition which satisfies any of the relevant access control condition and the other access control condition.

In the present drawing, the access control policy generation unit 460 causes the administrator to select the conjunction condition or the disjunction condition by displaying, for example, the following two options to the administrator:

1. "The object 'book' in the document structure satisfies both an access control condition [../@id='Java' ] and an access control condition [price>30 and price/@currency='$']"

2. "The object 'book' in the document structure satisfies at least one of an access control condition [../@id='Java' ] and an access control condition [price>30 and price/@currency='$']"

Then, the access control policy setting unit 445 generates and sets access control policies based on the selected conjunction or disjunction condition (S1880). In the present example, as a result of selecting the disjunction condition, a predicate expression of a combined condition is represented as [../@id='Java' or price>30 and price/@currency='$'] by "pred_merger." Through the above-described process, the following access control policies are generated:

```
<USER, Seki, /store, +r>
<USER, Seki, /store/category, +r>
<USER, Seki, /store/category/book[../@id='Java' or
price>30 and price/@currency='$'], +r>
... (the rest is omitted)
```

Thus, the access control policy setting unit 445 sets the access control condition for the abstract object "book" as shown in FIGS. 16 to 18. This makes it possible to set the access control condition for each of the plurality of objects generated as the abstract object, i.e., for descriptions in all "book" tags.

FIGS. 19A and 19B show examples (third examples) of objects accessed in accordance with access control policies set by the policy generation system 10. FIG. 19A shows objects read by the user accessing the structured document in the case where the access control policies have been set through the process of FIG. 18. The user can read only information concerning books of which prices are more than 30 dollars or of which categories are "Java."

FIG. 19B shows objects read in the case where the conjunction condition has been selected instead of the disjunction condition in S1880. The user can read only information concerning books of which prices are more than 30 dollars and of which categories are "Java." In this case, the following access control policies are generated:

```
<USER, Seki, /store, +r>
<USER, Seki, /store/category, +r>
<USER, Seki, /store/category/book[../@id='Java' and
price>30 and price/@currency='$'], +r>
... (the rest is omitted)
```

Figure 20:
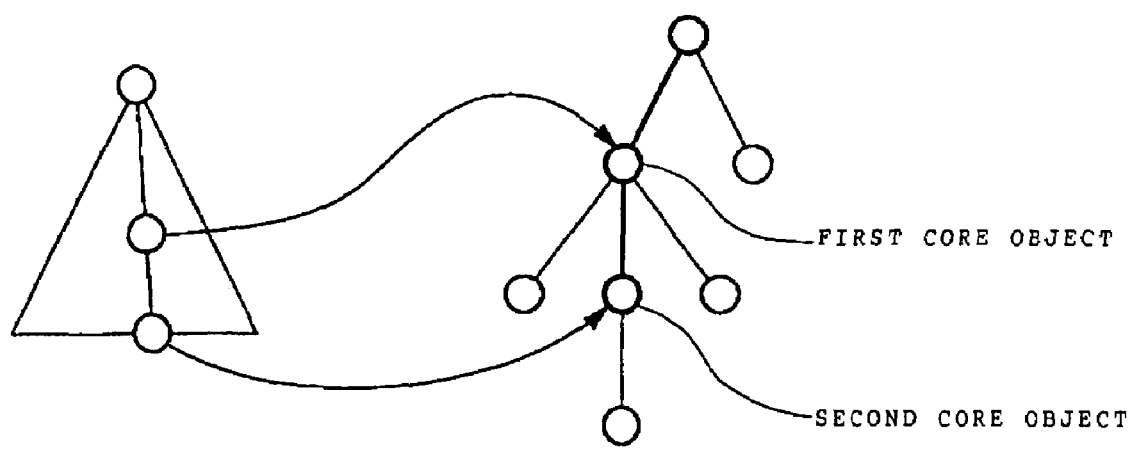
FIG. 20 shows an example (fourth example) of a configured pattern.

FIG. 20 shows an example (fourth example) of a configured pattern. First, the configured-pattern registration unit 470 registers, as a new pattern capable of being selected by the pattern selection unit 440, a configured pattern configured by selecting the fourth pattern twice. The present drawing shows the state in which the object selection unit 430 has selected first and second core objects and in which the pattern selection unit 440 has selected the configured pattern. As a result, the first core object and descendant objects thereof transition to authorized states in which a first access control condition has been set.

Then, the second core object transitions to an authorized state in which a second access control condition has been set. Here, the second core object is a descendant object of the first core object. Accordingly, a user can access the second core object and a descendant object thereof only in the case where both the first and second access control conditions are satisfied.

To cite a specific example of a process, in the case where this configured pattern has been selected by the pattern selection unit 440, the access control policy generation unit 460 executes the "upward" function and the "downward" function for the first core object, and executes the "upward" function and the "downward" function for the second core object. Then, in the case where a plurality of access control conditions are set for the same object, the access control policy generation unit 460 generates and sets a combined condition using "pred_merger."

Figure 21:
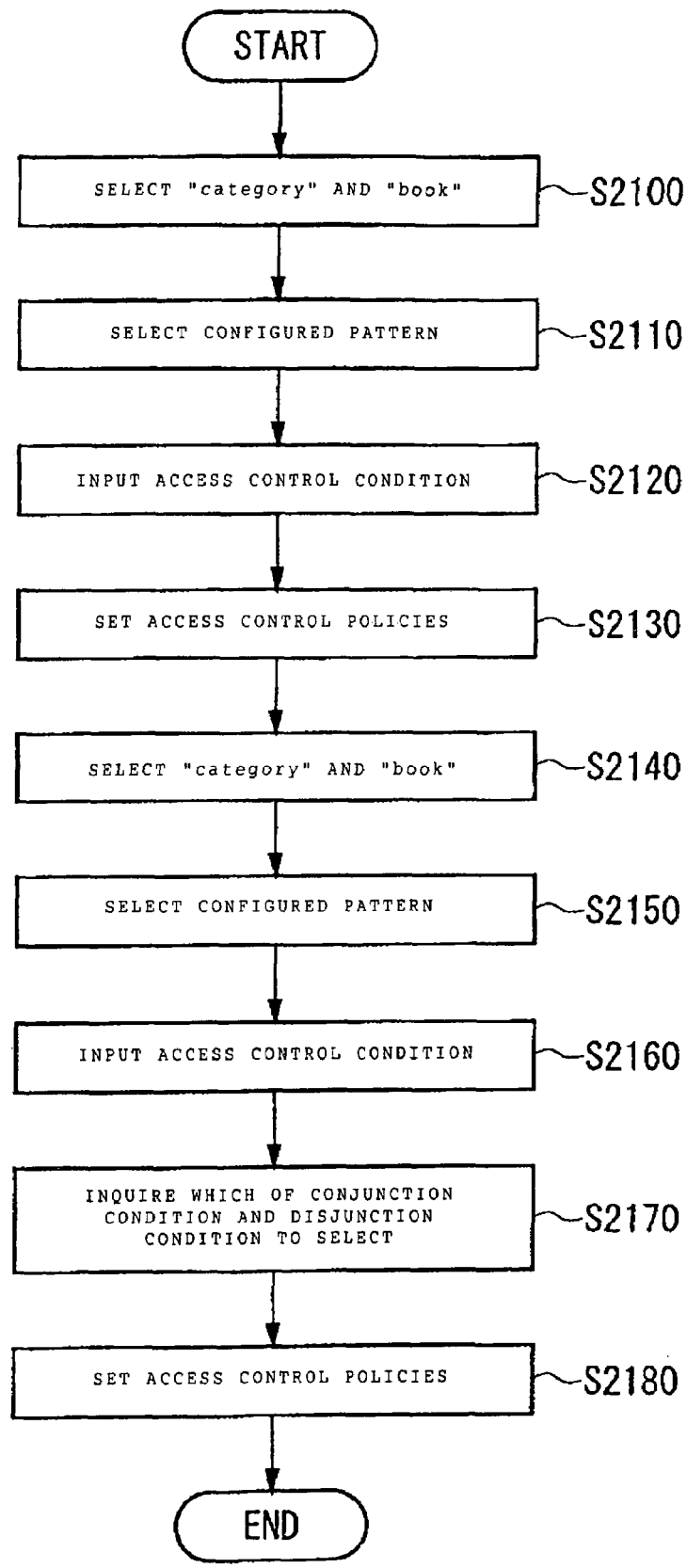
FIG. 21 shows an example (fourth example) of a process which the policy generation system 10 performs on a structured document using the configured pattern.

FIG. 21 shows an example (fourth example) of a process which the policy generation system 10 performs on a structured document using the configured pattern. A process by the abstract structure generation unit 400, an initialization process by the object state initialization unit 405, and a selectable pattern generation process by the selectable pattern generation unit 410 are approximately the same as the processes in S1400, S1405, and S1410 described in FIG. 14, respectively, and therefore will not be described in the present drawing. Further, a structured document and an abstract structure for which access control policies are to be set in the present example are approximately the same as the structured document and the abstract structure shown in FIGS. 16 and 17, and therefore will not be further described.

In the present example, the user whose user name is Seki is authorized to access information concerning books which are classified into the category of Java and of which prices are more than 30 dollars. Furthermore, in the present example, the user whose user name is Seki is authorized to access information concerning books which are classified into the category of "Business" and of which prices are more than 40 dollars. Hereinafter, the process will be described.

First, the object selection unit 430 selects the object "category" as a first core object, and selects the object "book" as a second object (S2100). The pattern selection unit 440 selects the configured pattern (S2110). The access control policy generation unit 460 causes an access control condition to be inputted for each of the first and second core objects (S2120).

For instance, the access control policy generation unit 460 causes a condition that the attribute "id" of the object "category" is Java to be inputted for the first core object. This condition is represented as [/store/category[@id='Java' ]] using a predicate expression. Then, the access control policy generation unit 460 causes a condition that the attribute "currency" of the object "book" is $ and that the object "price" is more than 30 to be inputted for the second core object. This condition is represented as [/store/category/book [@currency='$' and price>30]] using a predicate expression.

The access control policy generation unit 460 generates and sets access control policies (S2130). As a result, the following access control policies are generated:

```
<USER, Seki, /store, +r>
<USER, Seki, /store/category[@id='Java'], +r>
<USER, Seki,
/store/category[@id='Java']/book[@currency='$' and price>30],
+r>
... (the rest is omitted)
```

Subsequently, since all setting operations desired by the administrator have not been finished, the object selection unit 430 selects the object "category" as a first core object, and selects the object "book" as a second core object (S2140). The pattern selection unit 440 selects the configured pattern (S2150). The access control policy generation unit 460 causes an access control condition to be inputted for each of the first and second core objects (s2160).

The access control policy generation unit 460 causes a condition that the attribute "id" of the object "category" is "Business" to be inputted for the first core object. This condition is represented as /store/category[@id='Business' ] using a predicate expression. Then, the access control policy generation unit 460 causes a condition that the attribute "currency" of the object "book" is $ and that the object "price" is more than 40 to be inputted for the second core object. This condition is represented as /store/category/book[@currency='$' and price>40] using a predicate expression.

Since other access control condition has been already set for the setting target object, the access control policy generation unit 460 causes the administrator to select the conjunction condition or the disjunction condition of the newly-set access control condition and the already-set access control condition by inquiring of the administrator (S2170). For instance, the access control policy generation unit 460 generates combined conditions using "pred_merger" described in FIGS. 15A and 15B.

Specifically, the access control policy generation unit 460 first overwrites the access control condition set for the object "category" with an access control condition for the object "book," which is a descendant of the object "category." That is, in a predicate expression, /store/category[@id='Java' ] is overwritten with /store/category/book[../@id='Java' ]. Then, for the object "book," the access control policy generation unit 460 sets the conjunction condition of the access control condition after overwriting and the access control condition already set for the object "book." That is, a condition represented as /store/category/book[../@id='Java' and @currency='$' and price>30] in a predicate expression is set.

Next, the access control policy generation unit 460 overwrites the new access control condition set for the object "category" with an access control condition for the object "book," which is a descendant of the object "category." That is, in a predicate expression, /store/category[@id='Business'] is overwritten with /store/category/book[../@id='Business' ]. Then, for the object "book," the access control policy generation unit 460 sets the conjunction condition of the access control condition after overwriting and the new access control condition to be set for the object "book." That is, a condition represented as /store/category/book[../@id='Business' and @currency='$' and price>40] in a predicate expression is set.

Finally, the access control policy generation unit 460 causes the administrator to select any of the conjunction condition and the disjunction condition of the access control conditions for the object "category." In the case where the administrator has selected the disjunction condition, the access control policy generation unit 460 sets, as a new access control condition for the object "category," the disjunction of the predicate expressions set for the object "category" (S2180). Further, in this case, the access control policy generation unit 460 sets, as a new access control condition for the object "book," the disjunction of the predicate expressions set for the object "book."

Through the above-described process, the following access control policies are set:

<USER, Seki, /store, +r>
<USER, Seki, /store/category[@id='Java' or @id='Business'], +r>
<USER, Seki, /store/category[@id='Java' or @id='Business']/book[. ./@id='Java' and @currency='$' and price>30 or. ./@id='Business' and@currency='$' and price>40], +r>
... (the rest is omitted)

FIG. 22 shows an example (fourth example) of objects accessed in accordance with the access control policies set by the policy generation system 10. The user can read information concerning books which are classified into the category of Java and of which prices are more than 30 dollars in the structured document shown in FIG. 17. As a result, information concerning a book entitled "Java Script" can be read.

Further, the user can read information concerning books which are classified into the category of "Business" and of which prices are more than 40 dollars in the structured document shown in FIG. 17. As a result, information concerning a book entitled "Advanced modeling in finance using Excel and VBA" can be read.

FIG. 23 shows an example (fifth example) of an abstract structure of a structured document stored in the structured-document storage 100. FIG. 24 shows an example (fifth example) of a structured document stored in the structured-document storage 100. Still another example in which the policy generation system 10 sets access control policies will be described using FIGS. 23 to 27. The structured-document storage 100 stores a structured document beginning with a start tag <Org> and ending with an end tag </Org>.

A <Dep> tag, an <Emp> tag, and a <Name> tag are described in this order between the start tag <Org> and the end tag </Org>. Accordingly, abstract objects "Org," "Dep," "Emp," and "Name" become ancestor objects and descendant objects in this order. Further, since a plurality of <Dep> tags are described between the <Org> tag and the </Org> tag, the abstract structure generation unit 400 generates one abstract object "Dep" by combining these <Dep> tags. Similarly, since a plurality of <Emp> tags are described between each <Dep> tag and the corresponding </Dep> tag, the abstract structure generation unit 400 generates one abstract object "Emp" by combining these <Emp> tags.

Furthermore, since a <Name> tag and a <Salary> tag are described between each <Emp> tag and the corresponding </Emp> tag, the abstract objects "Name" and "Salary" are descendant objects of the abstract object "Emp." Moreover, the abstract object "Dep" has an attribute object "code" as a descendant object, and the abstract object "Emp" has an attribute object "role" as a descendant object.

FIGS. 25A and 25B are diagrams for explaining another process in which the policy generation system 10 sets a combined condition. As described previously, in the case where an access control condition is newly set for an object for which an access control condition has been already set, a combined condition may be generated and set. As a specific example for this, a process in which the access control policy generation unit 460 inquires of the administrator which of a disjunction condition or a conjunction condition to select has been described in FIG. 18.

However, only a disjunction condition or a conjunction condition may be insufficient depending on the types of access control conditions. In the present drawing, the case where an access control condition is a condition on a grandchild object of a setting target object will be described. Specifically, a condition that an attribute object "d" of a descendant object "b" of an object "a" is 2 has been already set for the setting target object "a." This condition is represented as a[b/@d=2] in a predicate expression.

Then, the access control policy generation unit 460 sets a new access control condition for the object "a." The access control policy generation unit 460 sets, for the setting target object "a," a condition that an attribute object "c" of the descendant object "b" of the object "a" is 1. This condition is represented as a[b/@c=1] in a predicate expression. As a result, a plurality of access control conditions are set for the same object "a." FIG. 25A shows the plurality of access control conditions set for the object "a." Here, an object for which a condition is judged is referred to as a judgment target object. For example, the attribute objects "c" and "d" are judgment target objects.

In the case where these access control conditions are combined, the access control policy generation unit 460 first overwrites the access control conditions of the descendant objects with access control conditions of the ancestor objects. For example, the access control policy generation unit 460 overwrites @c[.=1] with b[@c=1], and overwrites @d[.=2] with b[@d=2]. FIG. 25B shows access control conditions after overwriting.

Subsequently, the access control policy generation unit 460 compares the two predicate expressions of the access control conditions, and judges whether or not there is a common ancestor object on routes from the judgment target objects "c" and "d" as origins to the core object "a" selected by the object selection unit 430. As a result, the access control policy generation unit 460 judges that there is a common object "b."

In this case, in addition to a disjunction condition and a conjunction condition, the access control policy generation unit 460 provides, as options capable of being selected by the administrator, a condition obtained by adding a condition that there is the same object on both the routes from the judgment target objects as origins to the core object "a" to the conjunction condition. This condition is referred to as a second conjunction condition in the description below. That is, the access control policy generation unit 460 generates, as a conjunction condition, a condition that any one object "b" among a plurality of objects generated as descendant abstract objects of the object "a" satisfies @c=1 and that other object "b" satisfies @d=2. Furthermore, in the example of the present drawing, the access control policy setting unit 445 provides, as options, not only these disjunction and product conditions but also the second conjunction condition that any one or more identical objects "b" among the plurality of objects represented as the relevant abstract object satisfy both @c=1 and @d=2.

It is noted that in the case where the access control policy generation unit 460 compares the two predicate expressions of the access control conditions and there is no common ancestor object on the routes from the judgment target objects as origins to the core object, the access control policy generation unit 460 causes the administrator to select any of the conjunction condition and the disjunction condition and excludes the second conjunction condition from options.

Figure 26:
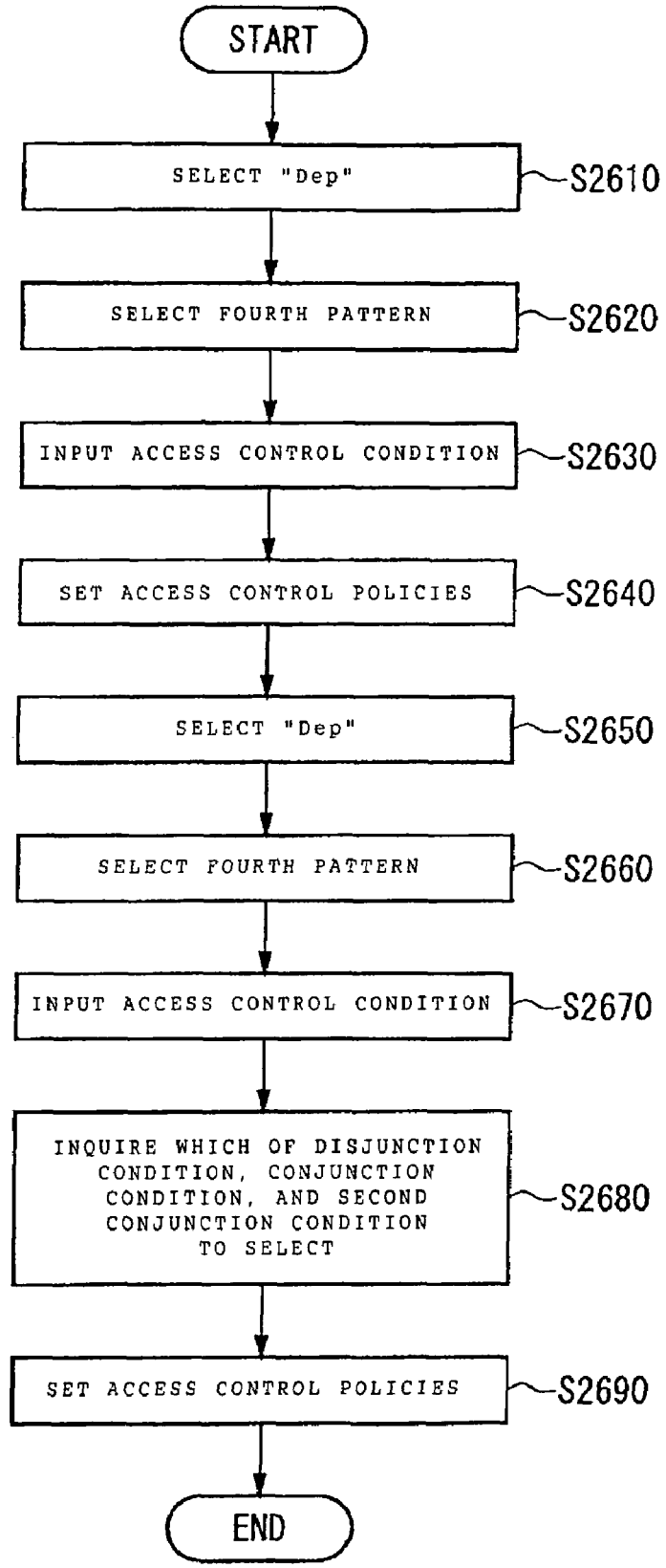
FIG. 26 shows an example (fifth example) of a process which the policy generation system 10 performs on the structured document.

FIG. 26 shows an example (fifth example) of a process which the policy generation system 10 performs on a structured document. The present drawing describes a process in which, using the structured document shown in FIGS. 23 and 24 as an input, the policy generation system 10 authorizes an employee, who is a manager, to read materials concerning employees of a department to which the manager is assigned. It is noted that a process by the abstract structure generation unit 400, an initialization process by the object state initialization unit 405, and a selectable pattern generation process by the selectable pattern generation unit 410 in the present example are approximately the same as the processes in S1400, S1405, and S1410 described in FIG. 14, respectively, and therefore will not be described in the present drawing.

The object selection unit 430 selects the object "Dep" as a core object (S2610). Then, the pattern selection unit 440 selects the fourth pattern (S2620). The access control policy generation unit 460 causes a predicate expression /Org/Dep [Emp/Name=$User] to be inputted as an access control condition, and causes "+r" to be inputted as a mode action (S2630). This access control condition indicates that the reading of all descendant objects of /Org/Dep is authorized in the case where any of grandchild objects "Name" is the same as the user name of a user. As a result, the following access control policies are generated (S2640):

```
<GROUP, Manager, /Org, +r>
<GROUP, Manager, /Org/Dep[Emp/Name=$User], +r>
<GROUP, Manager, /Org/Dep[Emp/Name=$User]/@code, +r>
<GROUP, Manager, /Org/Dep[Emp/Name=$User]/Emp, +r>
<GROUP, Manager, /Org/Dep[Emp/Name=$User]/text( ), +r>
<GROUP, Manager, /Org/Dep[Emp/Name=$User]/Emp/@role, +r>
<GROUP, Manager, /Org/Dep[Emp/Name=$User]/Emp/Name, +r>
<GROUP, Manager, /Org/Dep[Emp/Name=$User]/Emp/Salary, +r>
<GROUP, Manager, /Org/Dep[Emp/Name=$User]/Emp/text( ), +r>
<GROUP, Manager, /Org/Dep[Emp/Name=$User]/Emp/Name/text( ), +r>
<GROUP, Manager, /Org/Dep[Emp/Name=$User]/Emp/Salary/text( ), +r>
```

Subsequently, since all setting operations desired by the administrator have not been finished, the object selection unit 430 selects the object "Dep" as a core object (S2650). Then, the pattern selection unit 440 selects the fourth pattern (S2660). The access control policy generation unit 460 causes a predicate expression /Org/Dep[Emp/@role='MG' ] to be inputted as an access control condition and causes "+r" to be inputted as a mode action (S2670).

The access control policy generation unit 460 judges that other access control condition has been already set for the setting target object and that there is the same object on the respective routes from the judgment target objects to the core object (S2680). That is, the attribute object "role" and the object "Name" have a common ancestor object "Emp." Accordingly, the access control policy generation unit 460 displays a disjunction condition, a conjunction condition, and a second conjunction condition to the administrator and causes the administrator to select one.

In the present example, the second conjunction condition indicates "having, as a descendant object, 'Emp' simultaneously satisfying Name=@User and @role='MG.'" The case where the second conjunction condition has been selected by the administrator will be described. First, the access control policy generation unit 460 overwrites a predicate expression Emp/Name=$User with Emp [Name=$User] and overwrites a predicate expression Emp/@role='MG' with Emp[@role='MG'].

Then, in order to set as a new condition a condition that the same "Emp" satisfies both conditions, the access control policy generation unit 460 generates Emp[Name=$User and @role='MG' ] from the conjunction of Emp[Name=$User] and Emp[@role='MG' ] (S2690). Through the above-described process, the following access control policies are generated:

```
<GROUP, Manager, /Org, +r>
<GROUP, Manager, /Org/Dep[Emp[@role='MG' and Name=$User]], +r>
<GROUP, Manager, /Org/Dep[Emp[@role='MG' and Name=$User]]/@code, +r>
<GROUP, Manager, /Org/Dep[Emp[@role='MG' and Name=$User]]/Emp, +r>
<GROUP, Manager, /Org/Dep[Emp[@role='MG' and Name=$User]]/text( ), +r>
<GROUP, Manager, /Org/Dep[Emp[@role='MG' and Name=$User]]/Emp/@role, +r>
<GROUP, Manager, /Org/Dep[Emp[@role='MG' and Name=$User]]/Emp/Name, +r>
<GROUP, Manager, /Org/Dep[Emp[@role='MG' and
```

-continued

```
Name=$User]]/Emp/Salary, +r>
    <GROUP, Manager, /Org/Dep[Emp[@role='MG' and
Name=$User]]/Emp/text( ), +r>
    <GROUP, Manager, /Org/Dep[Emp[@role='MG' and
Name=$User]]/Emp/Name/text( ), +r>
    <GROUP, Manager, /Org/Dep[Emp[@role='MG' and
Name=$User]]/Emp/Salary/text( ), +r>
```

Figures 27, 28:
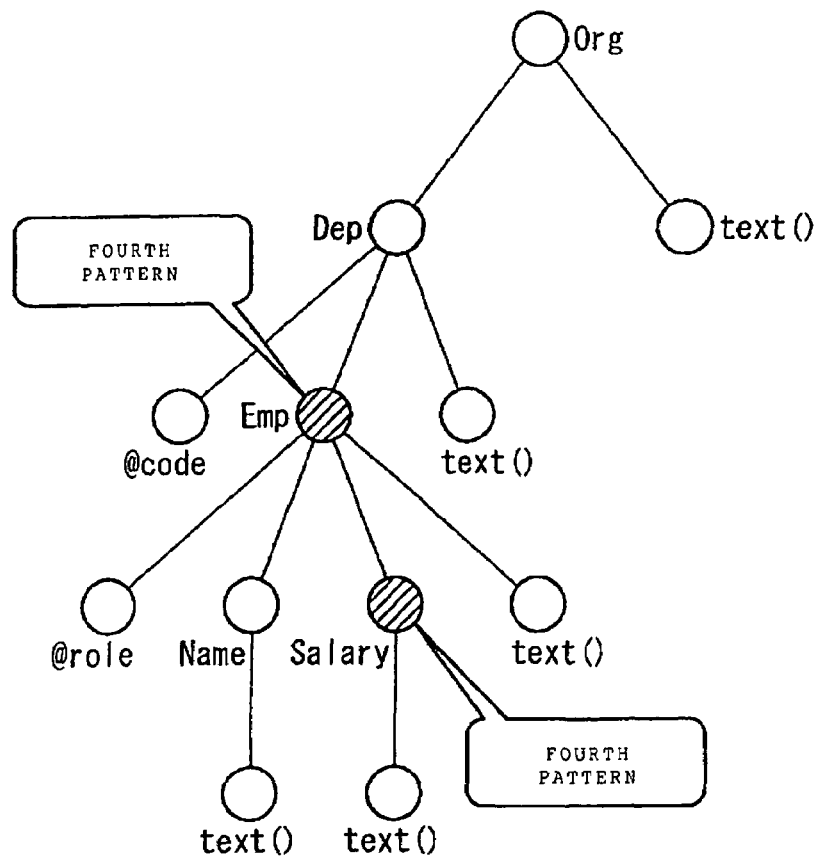
FIG. 27 shows an example (fifth example) of objects accessed in accordance with access control policies set by the policy generation system 10.
FIG. 28 shows a first process (sixth example) of a process which the policy generation system 10 performs on the abstract structure of the structured document.

FIG. 27 shows an example (fifth example) of objects accessed in accordance with the access control policies set by the policy generation system 10. A user whose "role" is "MG" and whose user name is "M.N." can read all pieces of information concerning employees in an organization of the user. On the other hand, in the case where the administrator has selected the conjunction condition in S2680 of FIG. 26, a user whose "role" is "GL" can also read the document shown in the present drawing. Access control policies in this case are shown below.

```
<GROUP, Manager, /Org, +r>
    <GROUP, Manager, /Org/Dep[Emp/Name=$User and
Emp/@role='MG'], +r>
```

Thus, access control policies desired by the administrator can be easily set by adding a method of generating a combined condition as shown in the present drawing.

FIG. 28 shows a first process (sixth example) of a process which the policy generation system 10 performs on the abstract structure of the structured document. An example of a process in which the administrator newly registers a configured pattern will be described using FIGS. 28 to 31. First, the access control policy setting apparatus 120 selects the object "Emp" and the fourth pattern, sets a first access control condition, and generates access control policies. Then, the access control policy setting apparatus 120 selects the object "Salary," which is a descendant object of the object "Emp," selects the fourth pattern, sets a second access control condition, and generates access control policies.

As a result, access to descendant objects of the object "Emp" is authorized only in the case where the first access condition is satisfied. Further, access to a descendant object of the object "Salary" is authorized only in the case where the second access condition is satisfied. The configured-pattern registration unit 470 may register, as a new configured pattern, a history of a pattern consecutively selected twice or more in the past as described above.

At this time, the configured-pattern registration unit 470 preferably registers a condition that a second selected object is limited to a descendant object of a first selected object, in addition to a process for selecting the fourth pattern twice. Subsequently, a process in the case where this configured pattern has been selected by the pattern selection unit 440 will be described.

It is noted that patterns constituting a configured pattern are referred to as sub-patterns in the description below. Further, the list of sub-patterns constituting a given configured pattern is referred to as the pattern list of the configured pattern.

Figure 29:
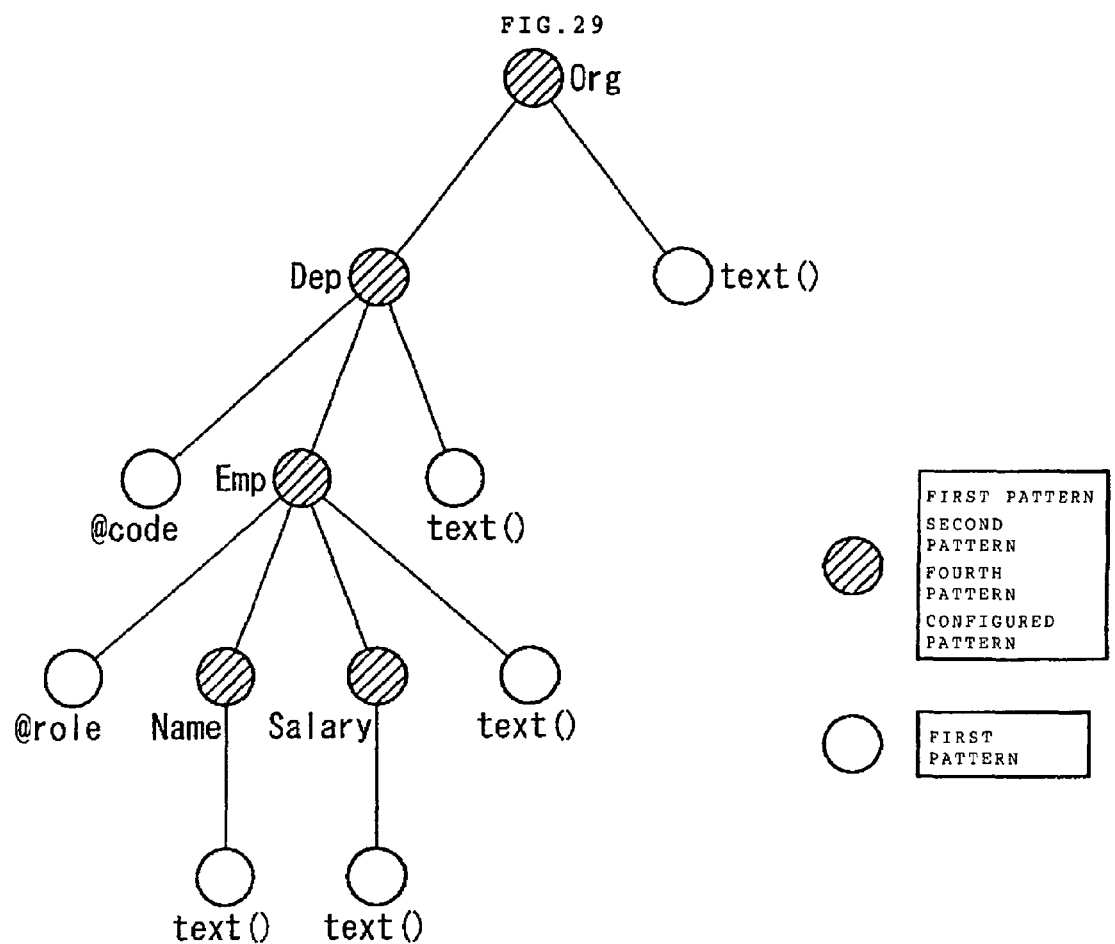
FIG. 29 shows a second process (sixth example) of the process which the policy generation system 10 performs on the abstract structure of the structured document.

FIG. 29 shows a second process (sixth example) of the process which the policy generation system 10 performs on the abstract structure of the structured document. In the case where the object selection unit 430 has selected the object "Org," "Dep," "Emp," "Name," or "Salary" in an initial state, the pattern selection unit 440 can select the configured pattern. Furthermore, in this case, the first, second, or third pattern can also be selected. In the case where the object selection unit 430 has selected other object, the pattern selection unit 440 can select only the first pattern.

The object selection unit 430 selects the object "Emp," and the pattern selection unit 440 selects the configured pattern. Then, the access control policy generation unit 460 causes an access control condition "pred1" to be inputted. Since the configured pattern includes two fourth patterns, the state of each object transitions in accordance with the fourth pattern. As a result, the following access control policies are generated:

```
<GROUP, Employee, /Org, +, r>
<GROUP, Employee, /Org/Dep, +, r>
<GROUP, Employee, /Org/Dep/Emp[pred1], +, r>
<GROUP, Employee, /Org/Dep/Emp[pred1]/@role, +, r>
<GROUP, Employee, /Org/Dep/Emp[pred1]/Name, +, r>
<GROUP, Employee, /Org/Dep/Emp[pred1]/Name/text( ), +,
r>
<GROUP, Employee, /Org/Dep/Emp[pred1]/Salary, +, r>
<GROUP, Employee, /Org/Dep/Emp[pred1]/Salary/text( ), +,
r>
<GROUP, Employee, /Org/Dep/Emp[pred1]/text( ), +, r>
```

Figure 30:
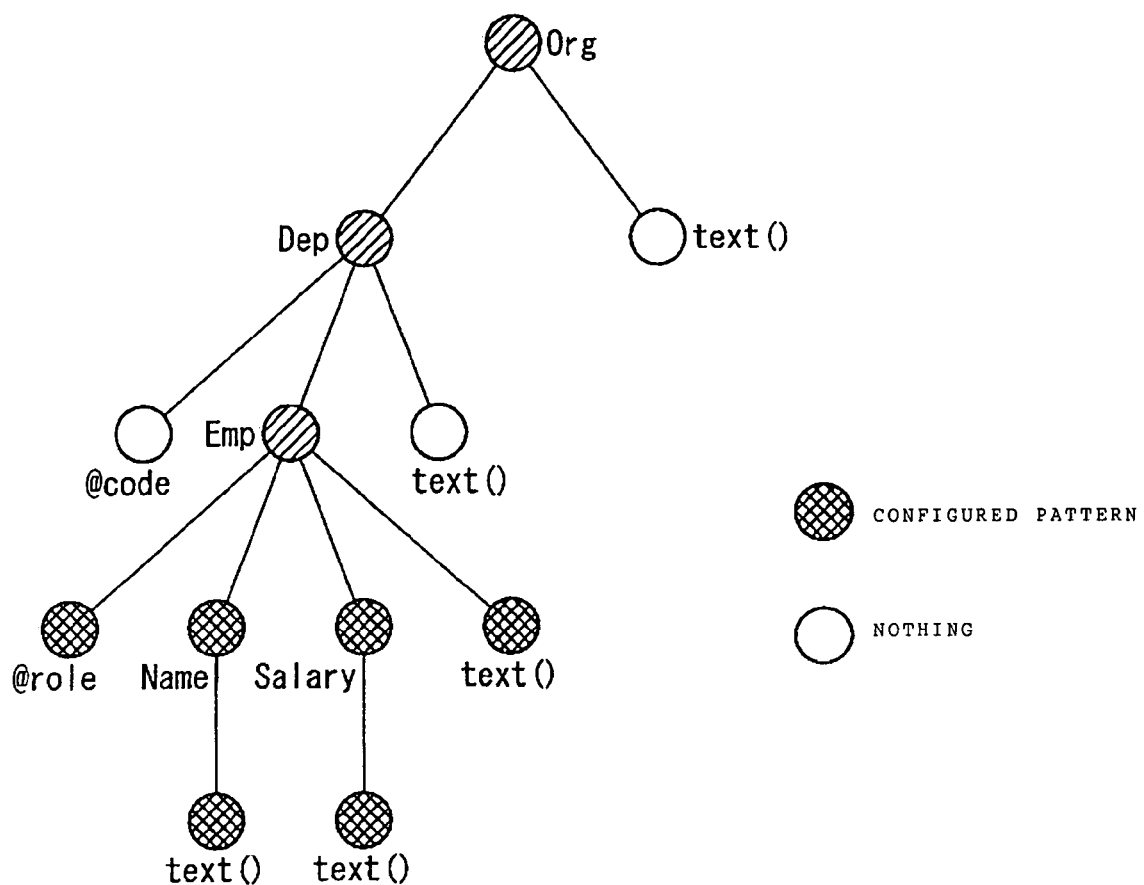
FIG. 30 shows a third process (sixth example) of the process which the policy generation system 10 performs on the abstract structure of the structured document.

FIG. 30 shows a third process (sixth example) of the process which the policy generation system 10 performs on the abstract structure of the structured document. Since an unprocessed sub-pattern is contained in the pattern list of the configured pattern, the selectable pattern generation unit 410 selects only the unprocessed sub-pattern as a selectable pattern, and displays the unprocessed sub-pattern to the administrator. Here, the unprocessed sub-pattern is the fourth pattern to be processed for a second time. The present drawing shows, for each object, selectable patterns generated by the selectable pattern generation unit 410.

As a result, in the case where the object selection unit 430 has selected a descendant object of the object "Emp," the pattern selection unit 440 can select only the fourth pattern. This allows a process concerning the configured pattern to be properly completed. Subsequently, the access control policy generation unit 460 causes a second access control condition "pred2" to be inputted, and generates access control policies. The access control policy generation unit 460 generates access control policies by combining the access control conditions "pred1" and "pred2." As a result, the following access control policies are generated:

```
<GROUP, Employee, /Org, +, r>
<GROUP, Employee, /Org/Dep, +, r>
<GROUP, Employee, /Org/Dep/Emp[pred1], +, r>
<GROUP, Employee, /Org/Dep/Emp[pred1]/@role, +, r>
<GROUP, Employee, /Org/Dep/Emp[pred1]/Name, +, r>
<GROUP, Employee, /Org/Dep/Emp[pred1]/Name/text( ), +,
r>
<GROUP, Employee, /Org/Dep/Emp[pred1]/Salary[pred2], +,
r>
    <GROUP,                                Employee,
/Org/Dep/Emp[pred1]/Salary[pred2]/text( ), +, r>
```

Figure 31:
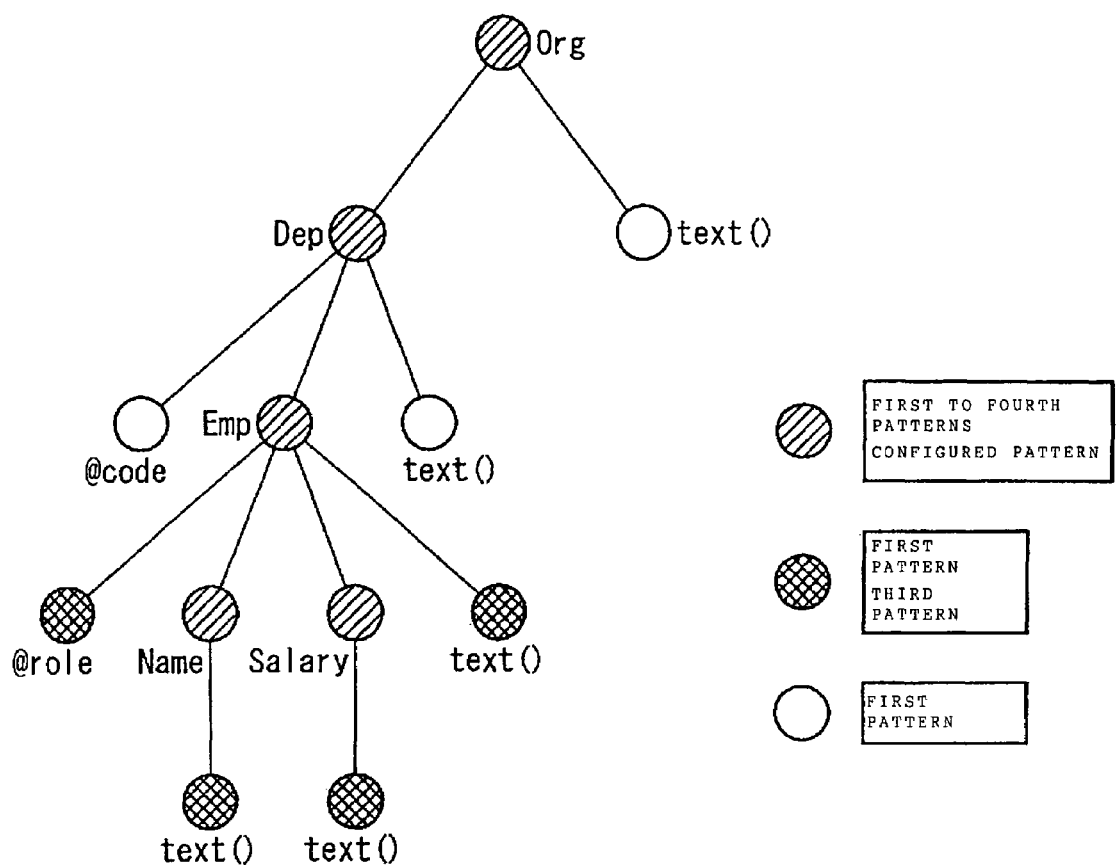
FIG. 31 shows a fourth process (sixth example) of the process which the policy generation system 10 performs on the abstract structure of the structured document.

FIG. 31 shows a fourth process (sixth example) of the process which the policy generation system 10 performs on the abstract structure of the structured document. Since no unprocessed sub-pattern is contained in the pattern list of the configured pattern, the selectable pattern generation unit 410 generates selectable patterns based on the object state transition data storing unit 310. The present drawing shows selectable patterns for each object.

Thus, as described in the present example, in the case where the configured pattern has not been processed, the selectable pattern generation unit 410 generates only an unprocessed pattern as a selectable pattern. This makes it possible to properly complete a process concerning the configured pattern in accordance with an intention of a person who has registered the configured pattern.

Figure 32:
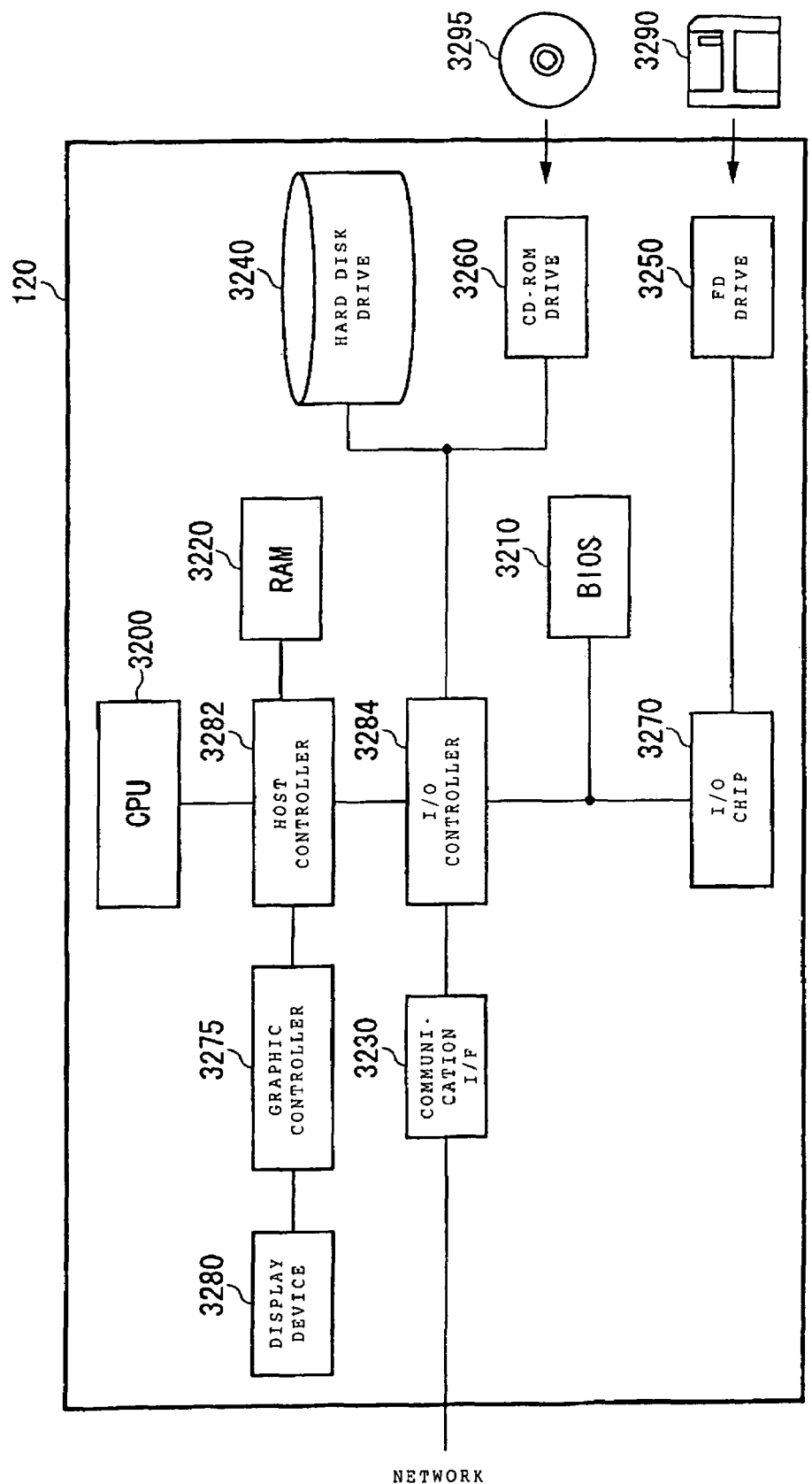
FIG. 32 shows an example of the hardware configuration of a computer which functions as the access control policy setting apparatus 120.

FIG. 32 shows an example of the hardware configuration of a computer which functions as the access control policy setting apparatus 120. The access control policy setting apparatus 120 includes a CPU peripheral section having a CPU 3200, a RAM 3220, a graphic controller 3275, and a display device 3280 which are connected to each other through a host controller 3282; an input/output section having a communication interface 3230, a hard disk drive 3240, and a CD-ROM drive 3260 which are connected to the host controller 3282 through an input/output controller 3284; and a legacy input/output section having a BIOS 3210, a flexible disk drive 3250, and an input/output chip 3270 which are connected to the input/output controller 3284.

The host controller 3282 connects the RAM 3220 with the CPU 3200 and the graphic controller 3275 which access the RAM 3220 at high transfer rates. The CPU 3200 operates based on programs stored in the BIOS 3210 and the RAM 3220 and controls each unit. The graphic controller 3275 acquires image data which the CPU 3200 or the like generates on a frame buffer provided in the RAM 3220, and displays the image data on the display device 3280. Instead of this, the graphic controller 3275 may include a frame buffer inside, which stores image data generated by the CPU 3200 or the like.

The input/output controller 3284 connects the host controller 3282 with the communication interface 3230, the hard disk drive 3240, and the CD-ROM drive 3260, which are relatively fast input/output devices. The communication interface 3230 communicates with an external device through a network. The hard disk drive 3240 stores programs and data used by the access control policy setting apparatus 120. The CD-ROM drive 3260 reads a program or data from the CD-ROM 3295, and provides the program or data to the input/output chip 3270 through the RAM 3220.

Moreover, the BIOS 3210 and relatively slow input/output devices including the flexible disk drive 3250, the input/output chip 3270, and the like, are connected to the input/output controller 3284. The BIOS 3210 stores a boot program executed by the CPU 3200 when the access control policy setting apparatus 120 is started, and a program and the like dependent on the hardware of the access control policy setting apparatus 120. The flexible disk drive 3250 reads a program or data from the flexible disk 3290, and provides the program or data to the input/output chip 3270 through the RAM 3220. The input/output chip 3270 connects to the flexible disk 3290 and various kinds of input/output devices through, for example, a parallel port, a serial port, a keyboard port, a mouse port, and the like.

A program provided to the access control policy setting apparatus 120 is stored on a recording medium, such as the flexible disk 3290, the CD-ROM 3295, an IC card, or the like, to be provided by a user. The program is read from the recording medium through the input/output chip 3270 and/or the input/output controller 3284, and installed on the access control policy setting apparatus 120 to be executed.

The program installed and executed on the access control policy setting apparatus 120 includes an object state initialization module, a selectable pattern generation module, an object selection module, a pattern selection module, an access control policy setting module, an object state update module, an access control policy generation module, and a configured-pattern registration module. An operation which each module actuates the access control policy setting apparatus 120 to perform is the same as that of the corresponding member in the access control policy setting apparatus 120 described in FIGS. 1 to 31. Accordingly, a description thereof will be omitted.

The above-described programs and modules may be stored on an external recording medium. In addition to the flexible disk 3290 and the CD-ROM 3295, optical recording media including DVDs and PDs, magneto-optical recording media including MDs, tape media, semiconductor memories including IC cards, and the like can be used as the recording medium. Moreover, a program may be provided to the access control policy setting apparatus 120 through a network using, as the recording medium, a storage device, such as a hard disk drive or a RAM, which is provided on a server system connected to a dedicated communication network or the Internet.

As described above, the present embodiment makes it possible to efficiently set, for data having a hierarchical structure such as a tree structure or the like, access control policies in which authorization for or prohibition of access or the like is determined. At this time, the administrator can make settings for many objects in a small number of operations by selecting an object contained in the tree structure and a pattern indicating relative positions to the object. For example, an administrator has realized the settings shown in the first example of the present embodiment in 19 operations in a known technology, whereas the administrator can realize the same settings in four operations in the present embodiment.

Further, a mismatch in which access to an object at a lower level in hierarchy is authorized though access to an object at a higher level in hierarchy is prohibited can be prevented from occurring by properly designing such patterns. Moreover, since a configured pattern obtained by combining existing patterns can be registered, a combination of frequently used patterns can be easily selected.

Although the present invention has been described above using the embodiment, the technical scope of the present invention is not limited to the scope of the description of the above-described embodiment. It is apparent to those skilled in the art that various modifications and improvements can be made in the above-described embodiment. From the description of the claims, it is apparent that aspects in which such modifications and improvements are made can also be included in the technical scope of the present invention.

According to the above-described embodiment, a setting apparatus, a setting method, a program, and a recording medium described in the following items can be realized.

(Item 1) A setting apparatus for setting any of authorization for and prohibition of access to data with a hierarchical structure, comprising: an object selection unit for selecting at least one object from a plurality of objects constituting the hierarchical structure; a pattern selection unit for selecting at least one pattern from a plurality of patterns, each of which determines a relative position in the hierarchical structure to the object selected by the object selection unit; and an access control policy setting unit for setting any of authorization for and prohibition of access to the object selected by the object selection unit and each of objects at the relative position to the selected object, the relative position being determined by the pattern selected by the pattern selection unit.

(Item 2) The setting apparatus according to item 1, wherein the access control policy setting unit further sets an access control condition for each of the objects located at the relative position to the object selected by the object selection unit, which relative position is determined by the pattern selected by the pattern selection unit, the access control condition being any one of a condition for authorizing access to the relevant object and a condition for prohibiting access to the relevant object.

(Item 3) The setting apparatus according to item 2, wherein the plurality of objects constitute a tree structure, a root node of the tree structure represents the object at a highest level in hierarchy, and a leaf node of the tree structure represents the object at a lowest level in hierarchy; the setting apparatus further comprises an abstract structure generation unit for generating an abstract structure generated by combining, into one abstract object, a plurality of objects which are at the same relative position to the root node as an origin in the hierarchical structure and which are of the same type; and the access control policy setting unit sets an access control condition for the abstract object and thereby sets an access control condition for each of the plurality of objects generated as the abstract object.

(Item 4) The setting apparatus according to item 2, wherein the access control policy setting unit sets, as the access control condition for each object, a condition to be satisfied by any one of identification information of a user who accesses the relevant object, an attribute of the user, and a type of the access.

(Item 5) The setting apparatus according to item 2, wherein in a case where other access control condition has been already set for a setting target object for which an access control condition is to be set, the access control policy setting unit sets a combined condition obtained by combining the newly-set relevant access control condition and the already-set other access control condition.

(Item 6) The setting apparatus according to item 5, wherein in the case where other access control condition has been already set for the setting target object, the access control policy setting unit causes an administrator to select any one of a conjunction condition which satisfies both the newly-set relevant access control condition and the already-set other access control condition and a disjunction condition which satisfies any one of the relevant access control condition and the other access control condition, and sets the selected conjunction condition or disjunction condition as the combined condition.

(Item 7) The setting apparatus according to item 6, wherein the access control condition is a condition to be satisfied by a judgment target object located at a lower level in hierarchy than that of the object selected by the object selection unit; and in the case where other access control condition has been already set for the setting target object, the access control policy setting unit provides, as an option capable of being selected by the administrator, a condition obtained by adding to the conjunction condition a condition that there is the same object on a route from the judgment target object as an origin to the object selected by the object selection unit in both the relevant access control condition and the other access control condition.

(Item 8) The setting apparatus according to item 2, wherein if both unconditional access authorization and access authorization in a case where an access control condition is satisfied are set for the same object, the access control policy setting unit authorizes access to the object in the case where the access control condition is satisfied.

(Item 9) The setting apparatus according to item 1, wherein the plurality of objects constitute a tree structure, a root node of the tree structure represents the object at a highest level in hierarchy, and a leaf node of the tree structure represents the object at a lowest level in hierarchy; the plurality of patterns include a first pattern in which access to each object on a route from the object selected by the object selection unit to the object represented as the root node is authorized; and in a case where the first pattern has been selected by the pattern selection unit, the access control policy setting unit authorizes access to each object on the route from the object selected by the object selection unit to the object represented as the root node.

(Item 10) The setting apparatus according to item 1, wherein the plurality of objects constitute a tree structure, a root node of the tree structure represents the object at a highest level in hierarchy, and a leaf node of the tree structure represents the object at a lowest level in hierarchy; the plurality of patterns include a second pattern in which access to each object on routes from the object selected by the object selection unit to the object represented as the root node and the object represented as the leaf node is authorized; and in a case where the second pattern has been selected by the pattern selection unit, the access control policy setting unit authorizes access to each object on the routes from the object selected by the object selection unit to the object represented as the root node and the object represented as the leaf node.

(Item 11) The setting apparatus according to item 1, wherein the plurality of objects constitute a tree structure, a root node of the tree structure represents the object at a highest level in hierarchy, and a leaf node of the tree structure represents the object at a lowest level in hierarchy; the plurality of patterns include a third pattern in which access to each object on a route from the object selected by the object selection unit to the object represented as the leaf node is prohibited; and in a case where the third pattern has been selected by the pattern selection unit, the access control policy setting unit prohibits access to each object on the route from the object selected by the object selection unit to the object represented as the leaf node.

(Item 12) The setting apparatus according to item 1, wherein the plurality of objects constitute a tree structure, a root node of the tree structure represents the object at a highest level in hierarchy, and a leaf node of the tree structure represents the object at a lowest level in hierarchy; the plurality of patterns include a fourth pattern in which, for each object on a route from the object selected by the object selection unit to the object represented as the leaf node, a condition for authorizing a user to access the relevant object is set; and in a case where the fourth pattern has been selected by the pattern selection unit, the access control policy setting unit sets, for each object on the route from the object selected by the object selection unit to the object represented as the leaf node, the condition for authorizing the user to access the relevant object.

(Item 13) The setting apparatus according to item 1, wherein in a case where both authorization for access and prohibition of access have been set for the same object, the access control policy setting unit prohibits access to the object.

(Item 14) The setting apparatus according to item 1, further comprising: a selectable pattern generation unit for generating, based on settings as to any of authorization for and prohibition of access, which settings have been already set for the plurality of objects in the hierarchical structure, a plurality of patterns capable of being selected by the pattern selection unit, wherein the pattern selection unit selects at least one pattern from the plurality of patterns generated by the selectable pattern generation unit.

(Item 15) The setting apparatus according to item 1, wherein each of the plurality of objects is any one of an element object containing a start tag indicating a start position of a description of information and an end tag indicating an end position of the description of the information, and an attribute object indicating an attribute of any one of the start tag and the end tag; the setting apparatus further comprises a selectable pattern generation unit for generating, based on whether the object selected by the object selection unit is the element object or the attribute object, a plurality of patterns capable of being selected by the pattern selection unit; and the pattern selection unit selects at least one pattern from the plurality of patterns generated by the selectable pattern generation unit.

(Item 16) The setting apparatus according to item 1, further comprising: a configured-pattern registration unit for registering, as a new pattern capable of being selected by the pattern selection unit, a configured pattern configured by selecting, at least twice, any of the plurality of patterns capable of being selected by the pattern selection unit, wherein in a case where the configured pattern has been selected by the pattern selection unit, the object selection unit selects a plurality of objects corresponding to the plurality of patterns constituting the configured pattern, and wherein the access control policy setting unit sequentially sets any of authorization for and prohibition of access, for each object located at the relative position determined by the pattern corresponding to each of the plurality of objects selected by the object selection unit.

(Item 17) A setting method for setting any of authorization for and prohibition of access to data with a hierarchical structure, the method comprising: an object selection step of selecting at least one object from a plurality of objects constituting the hierarchical structure; a pattern selection step of selecting at least one pattern from a plurality of patterns, each of which determines a relative position in the hierarchical structure to the object selected in the object selection step; and an access control policy setting step of setting any of authorization for and prohibition of access to the object selected in the object selection step and each of objects at the relative position to the selected object, the relative position being determined by the pattern selected in the pattern selection step.

(Item 18) A program for causing a computer to function as a setting apparatus which sets any of authorization for and prohibition of access to data with a hierarchical structure, the program causing the computer to function as: an object selection unit for selecting at least one object from a plurality of objects constituting the hierarchical structure; a pattern selection unit for selecting at least one pattern from a plurality of patterns, each of which determines a relative position in the hierarchical structure to the object selected by the object selection unit; and an access control policy setting unit for setting any of authorization for and prohibition of access to the object selected by the object selection unit and each of objects at the relative position to the selected object, the relative position being determined by the pattern selected by the pattern selection unit.

(Item 19) A recording medium on which the program according to item 18 is recorded.

What is claimed is:

1. A setting method for setting any authorization for and prohibition of access to data with a hierarchical structure, wherein
a plurality of objects constitute a tree structure, a root node of the tree structure represents an object at a highest level in hierarchy, and a leaf node of the tree structure represents the object at a lowest level in hierarchy wherein the objects contain start tags and end tags; and
the setting method comprises:
analyzing a structured document;
gathering a plurality of objects from the structured document into the hierarchical structure
organizing the plurality of objects according to an identical relative position originating from the root node in the hierarchical structure and by an identical type for generating an abstract structure generated based on generated objects as one abstract object, based on an inclusion relation among tags in the structured document;
selecting at least one gathered object from the plurality of objects constituting the hierarchical structure;
setting the object state of a abstract object, and prohibiting access to an initial state;
generating a plurality of patterns between the plurality of objects according to the relative position of the selected gathered object relative to the position of the plurality of objects in the hierarchical structure;
registering the plurality of patterns with a history of being consecutively selected twice or more in the past;
generating patterns based on whether an object is either an element object or an attribute object, and adding information corresponding to a new pattern to an object state table;
selecting at least one pattern from the plurality of patterns;
setting an access control condition to the plurality of objects generated as the abstract object by receiving input from an administrator for combining access control conditions;
setting an access control condition for authorization for and prohibition of access to the object selected and each of objects at the relative position to the selected object, the relative position being determined by the pattern selected;
setting the access control policy according to the attribute of an entity who performs an access, the selected object targeted by the access, and a process authorized for the object and representing the access control policy as a quadruple consisting of group name, user, object, and read authorization;
causing an administrator to select a conjunction condition and a disjunction condition when there is no ancestor object for two access control conditions;
generating a combined condition obtained by combining a newly-set access control condition with an already-set access control condition;
overwriting the access control condition for a descendant object with access control conditions of ancestor objects to combine conditions;
displaying the plurality of objects as an image representing the structure; and
displaying the patterns through a user interface unit, and formatting the patterns in a menu format in which the patterns are listed.

2. The setting method according to claim 1, wherein
the plurality of patterns include a first pattern in which access to each object on a route from the object selected in the object selection unit to the object represented as the root node is authorized, and
in a case where the first pattern has been selected by the pattern selection unit, an access control policy setting unit authorizes access to each object on the route from the object selected by the object selection unit to the object represented as the root node.

* * * * *

UNITED STATES PATENT AND TRADEMARK OFFICE
CERTIFICATE OF CORRECTION

PATENT NO. : 7,617,520 B2  Page 1 of 1
APPLICATION NO. : 11/062282
DATED : November 10, 2009
INVENTOR(S) : Naizhen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this

Nineteenth Day of October, 2010

David J. Kappos
*Director of the United States Patent and Trademark Office*